US012794660B2

(12) United States Patent
Franck et al.

(10) Patent No.: US 12,794,660 B2
(45) Date of Patent: Nov. 10, 2026

(54) HARMONIC PHASE ERROR DETECTION AND COMPENSATION

(71) Applicant: NVIDIA Corporation, Santa Clara, CA (US)

(72) Inventors: Thorkild Franck, Roskilde (DK); Akshay Shyam Pavagada Raghavendra, San Jose, CA (US); Vishnu Balan, Saratoga, CA (US)

(73) Assignee: NVIDIA Corporation, Santa Clara, CA (US)

( * ) Notice: Subject to any disclaimer, the term of this patent is extended or adjusted under 35 U.S.C. 154(b) by 126 days.

(21) Appl. No.: 18/910,499

(22) Filed: Oct. 9, 2024

(65) Prior Publication Data

US 2026/0100814 A1 Apr. 9, 2026

(51) Int. Cl.
*H04L 7/00* (2006.01)

(52) U.S. Cl.
CPC .......... *H04L 7/0054* (2013.01); *H04L 7/0016* (2013.01)

(58) Field of Classification Search
CPC ............................ H04L 7/0016; H04L 7/0054
USPC .......................................................... 375/354
See application file for complete search history.

(56) References Cited

U.S. PATENT DOCUMENTS 6,356,129 B1 * 3/2002 O'Brien .................. H03L 7/099 375/376
2023/0421349 A1 * 12/2023 Mohr .................... H04L 7/0334

* cited by examiner

*Primary Examiner* — Leila Malek
(74) *Attorney, Agent, or Firm* — Lowenstein Sandler LLP

(57) ABSTRACT

Technologies for periodic and synchronous phase error detection and compensation are described. An integrated circuit includes a clock source to generate a clock signal having a first frequency, and an analog-to-digital converter (ADC) to sample an incoming signal to obtain data samples using a sampling clock. The data samples include a periodic and synchronous phase error caused by the clock signal. The periodic and synchronous phase error has a harmonic of the first frequency. The integrated circuit also includes a signal processing circuit coupled to the ADC and the clock source. The signal processing circuit includes a harmonic phase correction block to detect and compensate for the periodic and synchronous phase error in the data samples to obtain corrected data samples.

23 Claims, 17 Drawing Sheets

700

800

Measurement on Actual Silicon. A Synchronous Phase Modulation With Frequency of the DSP Clock as Well as the First Overtone at Double the Frequency Is Detected. The Peak-Peak Amplitude Is About 8 mUI.

HARMONIC PHASE ERROR DETECTION AND COMPENSATION

TECHNICAL FIELD

At least one embodiment pertains to processing resources used to perform and facilitate network communication. For example, at least one embodiment pertains to detecting and compensating for harmonic phase noise.

BACKGROUND

Communications systems transmit and receive signals at a high data rate (e.g., up to 200 Gbits/sec). High-speed transmissions exhibit significant noise attributes (e.g., due to the transmission medium) that require the use of communication devices (e.g., transmitters and receivers) configured to perform digital pre-processing by the transmitter device and post-processing by the receiver device.

BRIEF DESCRIPTION OF DRAWINGS

Various embodiments in accordance with the present disclosure will be described with reference to the drawings, in which.

DETAILED DESCRIPTION

Figure 1A:
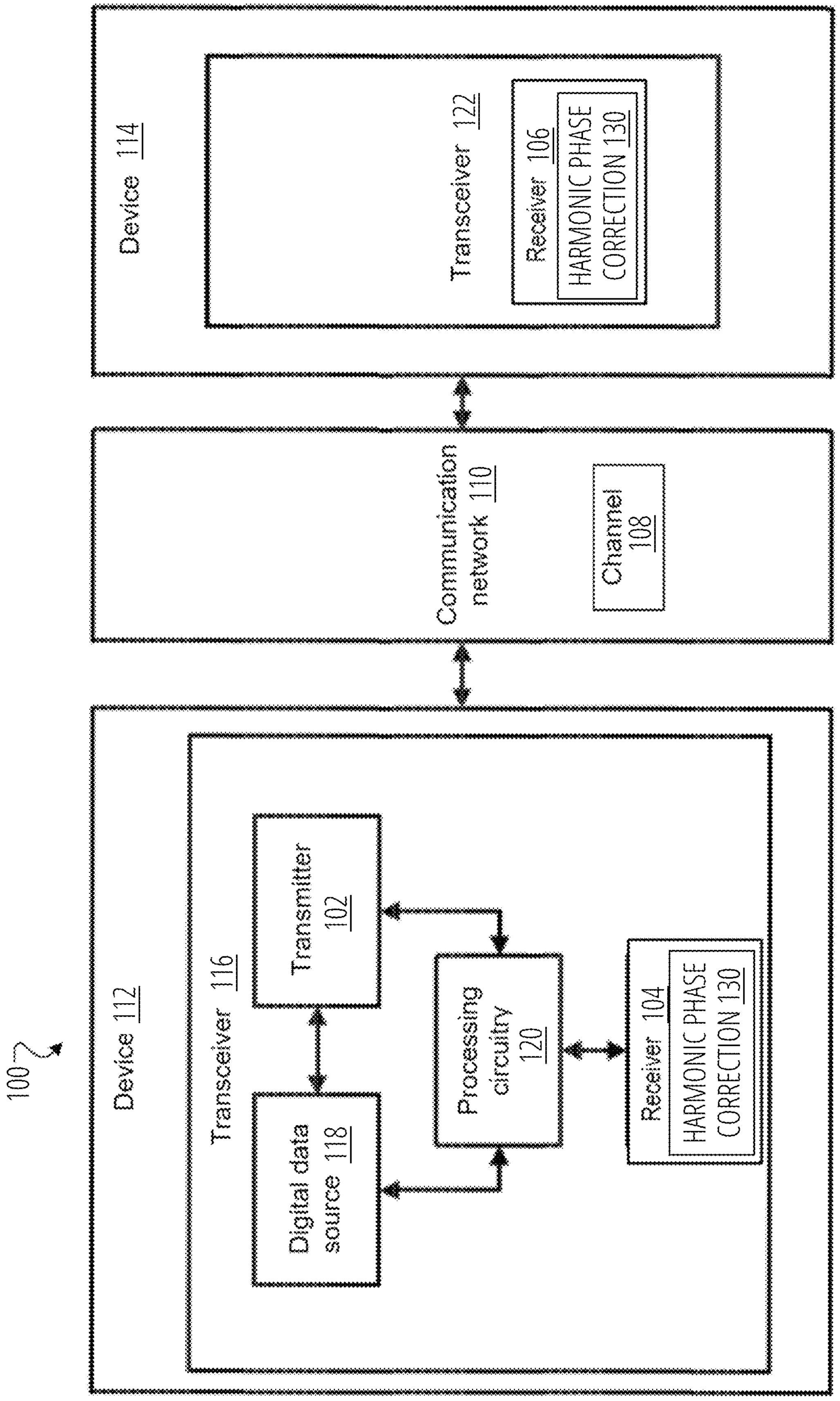
FIG. 1A illustrates an example communication system with a harmonic phase correction block, in accordance with at least some embodiments.

Technologies for periodic and synchronous phase error detection and compensation are described. The following description sets forth numerous specific details, such as examples of specific systems, components, methods, and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or presented in simple block diagram format to avoid obscuring the present disclosure unnecessarily. Thus, the specific details set forth are merely exemplary. Particular implementations may vary from these exemplary details and still be contemplated to be within the scope of the present disclosure.

A Digital Signal Processor (DSP) based Serializer/Deserializer (SerDes) is a high-speed data communication solution that employs digital signal processing techniques for efficient serialization and deserialization of parallel data streams. A DSP clock or its sub-harmonics or super-harmonics can cause a phase error that is periodic and synchronous to a sampler of the DSP. For example, the phase error can originate from unintentional coupling into a supply of the sampler or into a signal directly. A DSP is typically quite noisy on its core frequencies and that noise might deteriorate the sampled signal.

Aspects and embodiments of the present disclosure address these and other challenges by providing a harmonic phase correction block or circuit that detects and removes phase error that is periodic and synchronous to a sampler. A phase detector can obtain multiple detections (subsegments) within one DSP clock cycle (segment). The output of each subsegment is filtered and drives a re-sampler per subsegment in a closed-loop. This loop zeros the phase error per subsegment. The re-sampler can be a 3-tap finite impulse response (FIR) filter. For example, a DSP with a clock of 125 MHz and hence a segment length of 8 ns, should have a subsegment for each 1 ns. Such a scheme would provide eight corrections to the phase per segment and can thereby reasonably correct for a 125 MHz tone, should it inadvertently be coupled to the sampled signal. The interpolation filter can apply eight separate phase corrections per segment. As such, the interpolator filter can perform sub-tone cancelation of phase noise. Other scenarios are also possible: a feed-forward configuration or a single-phase detection per segment, but then only sub-harmonics of the DSP clock can be detected. With the aspects and embodiments of the present disclosure, this noise is detected, quantified, and compensated, for the benefit of improved link performance.

In at least one embodiment, an integrated circuit includes a clock source to generate a clock signal having a first frequency, and an analog-to-digital converter (ADC) to sample an incoming signal to obtain data samples using a sampling clock. The data samples include a periodic and synchronous phase error caused by the clock signal. The periodic and synchronous phase error has a harmonic of the first frequency. The integrated circuit also includes a signal processing circuit coupled to the ADC and the clock source. The signal processing circuit includes a harmonic phase correction block to detect and compensate for the periodic and synchronous phase error in the data samples to obtain corrected data samples.

FIG. 1A illustrates an example communication system 100 with a harmonic phase correction block 130, in accordance with at least some embodiments. The communication system 100 includes a device 112, a communication network 110 including a communication channel 108, and a device 114. In at least one example embodiment, devices 112 and device 114 correspond to one or more of a Personal Computer (PC), a laptop, a tablet, a smartphone, a server, a collection of servers, or the like. In some embodiments, the devices 112 and device 114 may correspond to any appropriate type of device that communicates with other devices also connected to a common type of communication network 110. According to embodiments, the receiver 104, 106 of devices 112 or 114 may correspond to a graphics processing unit (GPU), a switch (e.g., a high-speed network switch), a network adapter, a central processing unit (CPU), a data processing unit (DPU), etc. As another specific but non-limiting example, the devices 112 and device 114 may correspond to servers offering information resources, services and/or applications to user devices, client devices, or other hosts in the communication system 100.

Examples of the communication network 110 that may be used to connect the devices 112 and device 114 include an Internet Protocol (IP) network, an Ethernet network, an InfiniBand (IB) network, a Fibre Channel network, the Internet, a cellular communication network, a wireless communication network, combinations thereof (e.g., Fibre Channel over Ethernet), variants thereof, and/or the like. In other embodiments, the communication network 108 can be a Peripheral Component Interconnect Express (PCIe) interconnect. PCIe is a high-speed interface standard used to connect various hardware components. It can be an interconnect for devices such as graphics cards (GPUs), solid-state drives (SSDs), network cards, and other peripherals. PCIe offers a scalable, high-speed, and point-to-point connection between devices, including CPUs, GPUs, memory, and the like. In other embodiments, the communication network 110 can be a high-speed interconnect, such as an interconnect that deploys the NVLink technology. The NVLink interconnect can be a GPU-GPU interconnect used between GPUs, a CPU-GPU interconnect between GPUs and CPUs, or an interconnect used between other devices. NVLink offers a higher bandwidth and lower latency than traditional PCIe connections, which are typically used in computing hardware. NVLink is especially useful in scenarios that require massive parallel processing, such as artificial intelligence (AI), machine learning, deep learning, high-performance computing (HPC), and data analytics. For example, in NVIDIA's DGX systems and high-end gaming or AI workstations, NVLink helps GPUs exchange data at speeds that are necessary for demanding tasks like real-time ray tracing or training neural networks. The NVLink capacity can allow more GPUs to communicate through it. In one specific, but non-limiting example, the communication network 110 is a network that enables data transmission between the devices 112 and device 114 using data signals (e.g., digital, optical, wireless signals). The embodiments described herein can be utilized in a system with a high-speed, scalable switch, such as a switch using the NVSwitch technology. NVSwitch is a high-speed, scalable switch developed by NVIDIA that facilitates data communication between multiple GPUs in a system, allowing them to work together more efficiently by providing high-bandwidth, low-latency interconnections. The NVSwitch serves as a central hub or high-bandwidth fabric that interconnects all the GPUs in a system, enabling each GPU to communicate with every other GPU quickly and efficiently. The NVSwitch can be coupled between other types of devices, such as CPUs, accelerators, memory, or the like. The NVSwitch can be used for tasks requiring intense computation and collaboration between multiple GPUs, such as AI model training, scientific simulations, and large-scale data processing. The embodiments described herein can be used in a high-performance computing system, such as a computing system modeled after NVIDIA's DGX systems, which are designed specifically for artificial intelligence (AI), deep learning, and high-performance computing (HPC) workloads. DGX systems are optimized for large-scale GPU computation and parallel processing, integrating multiple GPUs, high-bandwidth interconnects, and software frameworks tailored for AI and HPC tasks. In at least one embodiment, a system for high-speed network communication includes a processing unit, a network interface comprising a receiver or transceiver with the load inductor structure with a closed ring, as described herein. The processing unit can include a CPU, a GPU, a DPU, a network adapter, a network switch, an NVLink switch, or the like.

Other examples for the communication network 110 can include other chip-to-chip or die-to-die interconnects, such as GRS, LPI (low power interface) or LLI (low latency interface).

The device 112 includes a transceiver 116 for sending and receiving signals, for example, data signals. The data signals may be digital or optical signals modulated with data or other suitable signals for carrying data.

The transceiver 116 may include a digital data source 118, a transmitter 102, a receiver 104, and processing circuitry 120 that controls the transceiver 116. The digital data source 118 may include suitable hardware and/or software for outputting data in a digital format (e.g., in binary code and/or thermometer code). The digital data output by the digital data source 118 may be retrieved from memory (not illustrated) or generated according to input (e.g., user input).

The transmitter 102 includes suitable software and/or hardware for receiving digital data from the digital data source 118 and outputting data signals according to the digital data for transmission over the communication network 110 to a receiver 106 of device 114.

The receiver 104, 106 of device 112 and device 114 may include suitable hardware and/or software for receiving signals, for example, data signals from the communication network 110. For example, the receivers 104, 106 may include components for receiving processing signals to extract the data for storing in a memory. In at least one embodiment, the receiver 106 includes a harmonic phase correction block 130. In another embodiment, the receiver 104 also includes a harmonic phase correction block 130. The receiver 106 receives an incoming signal and samples the incoming signal to generate samples, such as using an ADC. The ADC can be controlled by a clock and data recovery circuit (or clock recovery block) in a closed-loop tracking scheme. The clock and data recovery circuit can include a phase detector (or a Timing Extraction Device (TED)) that can measure a phase offset of the samples. The phase offset is also referred to as a sampling offset. The clock and data recovery circuit can include a controlled oscillator, such as a voltage-controlled oscillator (VCO) or a digitally-controlled oscillator (DCO) that controls the sampling of the subsequent data by the ADC. The clock and data recovery circuit can use other closed-loop tracking schemes to determine a sampling offset or phase offset. The receiver 104 can include a clock source to generate a clock signal having a first frequency. The ADC can sample an incoming signal to obtain data samples using a sample clock. The data samples can include a periodic and synchronous phase error caused by the clock signal. In particular, the periodic and synchronous phase error has a harmonic of the first frequency. The harmonic can be any one or more of a first harmonic (also referred to as fundamental frequency) of the clock signal, a super-harmonic of the clock signal, or a sub-harmonic of the clock signal. The harmonic phase correction block 130 can detect and compensate for the periodic and synchronous phase error in the data samples to obtain corrected data samples. The periodic and synchronous phase error can originate from an undesired coupling from the clock signal into a power supply grid of a sampler or a signal path of an incoming signal itself. In some cases, the incoming signal is received over a signal connection, such as a wire bond. The periodic and synchronous phase error can originate from a DSP clock, a clock source, or other external noise sources that are periodic and synchronous with the signal processing circuit. The periodic and synchronous phase error can be a distortion that is a harmonic of the same clock source that also steps the phase detector. So, there can be multiple paths from the same source that causes the distortion that can be detected and compensated for by the harmonic phase correction block 130.

In at least one embodiment, the transceiver 116 (or 122) can be an integrated circuit, and the clock source, the ADC, and the harmonic phase correction block 130 can be components of the integrated circuit. The harmonic phase correction block 130 can be part of the processing circuitry 120 (also referred to herein as signal processing circuit) and that is coupled to the ADC and the clock source. In at least one embodiment, the processing circuitry 120 is a DSP circuit. Additional details of the harmonic phase correction block 130 are discussed in more detail below with reference to the figures.

In at least one embodiment, the harmonic phase correction block 130 can be used in connection with a jitter correction block or jitter correction circuit, such as illustrated and described below with respect to FIG. 9, FIG. 10A, and FIG. 10B. The jitter correction block (also referred to as JITX) can use the phase offset (or sampling offset), measured by the phase detector (or a separate phase detector), to re-sample the current data to obtain re-sampled data in an open-loop compensation scheme. The re-sampling of the current data removes jitter from the current data. The jitter correction block can be considered to be extracting or removing the jitter from the signal or cleaning the signal from the jitter.

The processing circuitry 120 may comprise software, hardware, or a combination thereof. For example, the processing circuitry 120 may include a memory including executable instructions and a processor (e.g., a microprocessor) that executes the instructions on the memory. The memory may correspond to any suitable type of memory device or collection of memory devices configured to store instructions. Non-limiting examples of suitable memory devices that may be used include Flash memory, Random Access Memory (RAM), Read Only Memory (ROM), variants thereof, combinations thereof, or the like. In some embodiments, the memory and processor may be integrated into a common device (e.g., a microprocessor may include integrated memory). Additionally or alternatively, the processing circuitry 120 may comprise hardware, such as an application specific integrated circuit (ASIC). Other non-limiting examples of the processing circuitry 120 include an Integrated Circuit (IC) chip, a CPU, a GPU, a DPU, a microprocessor, a Field Programmable Gate Array (FPGA), a collection of logic gates or transistors, resistors, capacitors, inductors, diodes, or the like. Some or all of the processing circuitry 120 may be provided on a Printed Circuit Board (PCB) or collection of PCBs. It should be appreciated that any appropriate type of electrical component or collection of electrical components may be suitable for inclusion in the processing circuitry 120. The processing circuitry 120 may send and/or receive signals to and/or from other elements of the transceiver 116 to control the overall operation of the transceiver 116.

The transceiver 116 or selected elements of the transceiver 116 may take the form of a pluggable card or controller for the device 112. For example, the transceiver 116 or selected elements of the transceiver 116 may be implemented on a network interface card (NIC).

The device 114 may include a transceiver 122 for sending and receiving signals, for example, data signals over a communication channel 108 of the communication network 110. The communication channel 108 can be PCIe, NVLink, Ethernet, InfiniBand, Ground Reference Signal (GRS), Chip-to-Chip (C2C), Die-to-Die (D2D), or the like. The same or similar structure of the transceiver 116 may be applied to transceiver 122, and thus, the structure of transceiver 122 is not described separately.

Although not explicitly shown, it should be appreciated that devices 112 and device 114 and the transceivers 116 and 122 may include other processing devices, storage devices, and/or communication interfaces generally associated with computing tasks, such as sending and receiving data.

Figure 1B:
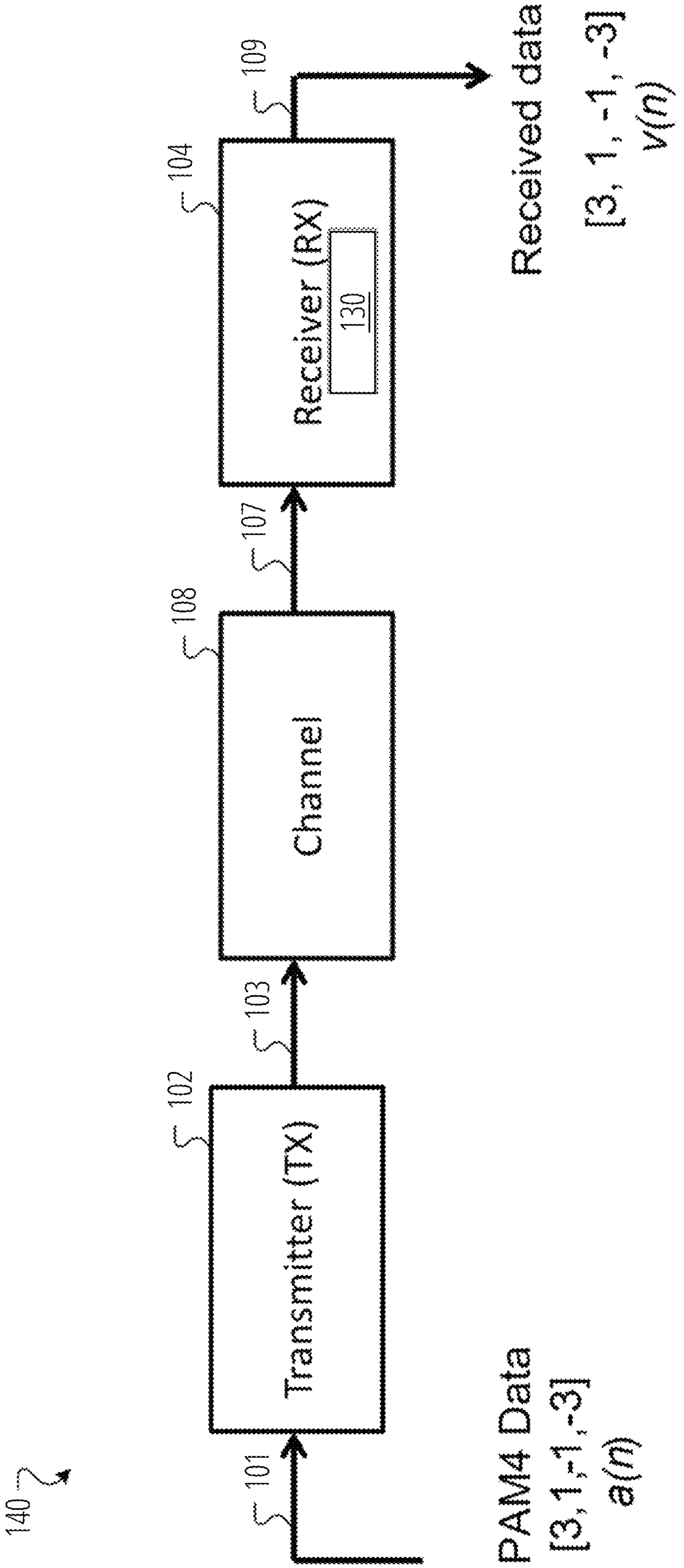
FIG. 1B is a block diagram of a communication system employing a harmonic phase correction block in a receiver device, according to at least one embodiment.

FIG. 1B illustrates a block diagram of an example communication system 140 employing a harmonic phase correction block 130 in a receiver 104, according to at least one embodiment. In the example shown in FIG. 1B, a PAM level-4 (PAM4) modulation scheme is employed with respect to the transmission of a signal (e.g., digitally encoded data) from a transmitter (TX) 102 to a receiver (RX) 104 via a communication channel 108 (e.g., a transmission medium). The communication channel 108 can be PCIe, NVLink, Ethernet, InfiniBand, GRS, C2C, D2D, or the like. In this example, the transmitter 102 receives a signal 101 as input data (i.e., the input data at time n is represented as "a(n)"), which is modulated in accordance with a modulation scheme (e.g., PAM4) and sends the signal 103, a(n), including a set of data symbols (e.g., symbols −3, −1, 1, 3, wherein the symbols represent coded binary data). It is noted that while the use of the PAM4 modulation scheme is described herein by way of example, other data modulation schemes can be used in accordance with embodiments of the present disclosure, including for example, a non-return-to-zero (NRZ) modulation scheme, PAM3, PAM7, PAM8, PAM16, etc. For example, for an NRZ-based system, the transmitted data symbols consist of symbols −1 and 1, with each symbol value representing a binary bit. This is also known as a PAM level-2 or PAM2 system as there are 2 unique values of transmitted symbols.

Typically, a binary bit 0 is encoded as −1, and a binary bit 1 is encoded as 1 as the PAM2 values.

In the example shown, the PAM4 modulation scheme uses four (4) unique values of transmitted symbols to achieve higher efficiency and performance. The four levels are denoted by symbol values −3, −1, 1, 3, with each symbol representing a corresponding unique combination of binary bits (e.g., 00, 01, 10, 11).

The communication channel 108 is a destructive medium in that the channel acts as a low pass filter which attenuates higher frequencies more than it attenuates lower frequencies, introduces inter-symbol interference (ISI) and noise from cross talk, from power supplies, from Electromagnetic Interference (EMI), or from other sources. The communication channel 108 can be over serial links (e.g., a cable, printed circuit board (PCB) traces, copper cables, optical fibers, or the like), read channels for data storage (e.g., hard disk, flash solid-state drives (SSDs), high-speed serial links, deep space satellite communication channels, applications, or the like).

As described above, in some communication systems, the transmitter 102 sends the signal 103 as a data signal without a transmitter clock used to generate the data signal. The receiver (RX) 104 receives an incoming signal 107 over the communication channel 108. The incoming signal 107 can be degraded and attenuated by the communication channel 108 and include noise. The incoming signal 107 can be affected by the transmitter clock jitter. The jitter correction block can detect and compensate for the jitter. The incoming signal 107 can be affected by harmonic phase noise from an undesired coupling between the clock signal and a power supply grid, a data path, or the like. The harmonic phase correction block 130 can be used to compensate for the harmonic phase noise as described herein. The harmonic phase correction block 130 can extract the phase noise before additional equalization and symbol detector logic in the receiver 104. The receiver 104 can output a received signal 109, "v(n)," including the set of data symbols (e.g., symbols −3, −1, 1, 3, wherein the symbols represent coded binary data). In at least one embodiment, the harmonic phase correction block 130 can use phase detector information for detecting and compensating for the harmonic phase noise. Additional details of the harmonic phase correction block 130 are discussed in more detail below with respect to FIG. 2.

Figure 2:
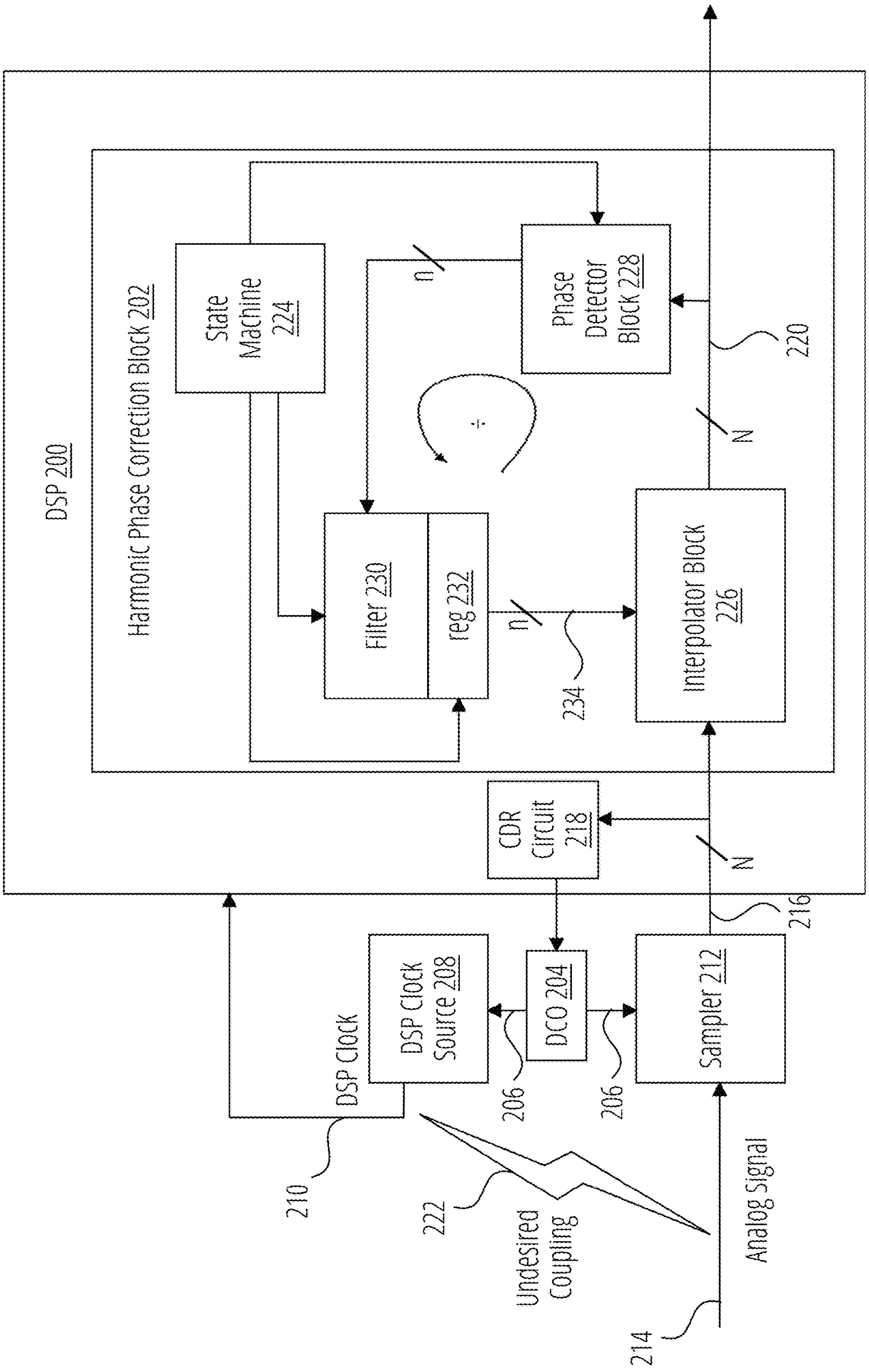
FIG. 2 is a block diagram of a Digital Signal Processor (DSP) with a harmonic phase correction block according to at least one embodiment.

FIG. 2 is a block diagram of a DSP 200 with a harmonic phase correction block 202 according to at least one embodiment. The DSP 200 can be a signal processing circuit and can be part of an integrated circuit. The integrated circuit also includes a DCO 204 that can provide a DCO signal 206 to a DSP clock source 208 and a sampler 212. The DCO signal 206 can have a frequency, for example, 13 GHz. The DSP clock source 208 can include circuitry that receives the DCO signal 206 (e.g., 13 GHz) and generates a DSP clock 210 that is used by the DSP 200. In at least one embodiment, the DSP clock source 208 is a frequency divider (e.g., 1/16 divider) that receives the DCO signal 206 and divides it by a fraction to obtain the DSP clock 210. The DSP clock 210 can have a first frequency, for example, 830 MHz, which is lower than the DCO signal's frequency. The sampler 212 can be an ADC, such as a sub-sampled ADC. The sampler 212 can receive an analog signal 214 and can sample the analog signal 214 using the DCO signal 206 (or a sampling clock that is a multiple of the DCO signal 206). The integrated circuit can receive the analog signal 214 over a signal connection, such as a wire bond of the integrated circuit. The sampler 212 can use the same DCO signal 206 from the DCO 204 to sample the analog signal 214. Alternatively, the sampler 212 can use another sampling clock with another frequency. The sampler 212 can sample the analog signal 214 as an incoming signal to obtain a sampled signal 216 (e.g., data samples) using a sample clock (e.g., DCO signal 206). The data samples can include a periodic and synchronous phase error caused by the DSP clock 210. In particular, the periodic and synchronous phase error has a harmonic of the first frequency of the DCO signal 206. The harmonic can be any one or more of a first harmonic (also referred to as fundamental frequency) of the DSP clock 210 (e.g., 830 MHz), a super-harmonic of the DSP clock 210 (e.g., 1660 MHz), or a sub-harmonic of the DSP clock 210 (e.g., 415 MHz). Alternatively, other super-harmonics or sub-harmonics can be present in the data samples of the sampled signal 216.

In at least one embodiment, the harmonic phase correction block 202 is similar to the harmonic phase correction block 130 of FIG. 1A and FIG. 1B. As described above, the harmonic phase correction block 202 can detect and compensate for the periodic and synchronous phase error in the data samples in the sampled signal 216 to obtain corrected data samples in an output signal 220. As described above, the periodic and synchronous phase error can originate from an undesired coupling 222 from the DSP clock 210 into a power supply grid of the sampler 212, a signal path of the incoming analog signal 214, or the like. In some embodiments, the analog signal 214 is received over a signal connection, such as a wire bond. The periodic and synchronous phase error can originate from the DSP clock 210 or the DSP clock source 208, a clock source such as the DCO 204, or other external noise sources that are periodic and synchronous with the DSP 200.

In at least one embodiment, as illustrated in FIG. 2, the harmonic phase correction block 202 includes a state machine 224, an interpolator block 226, a phase detector block 228, a filter 230, and a register 232 (also referred to as an offset register or accumulator register). The state machine 224 can manage operations of the filter register 230, the register 232 and the phase detector block 228. The state machine 224 can output a control signal at each of n number of subsegments of a clock cycle of the DSP clock 210. The state machine 224 can step through subsegments and update the register 232 one subsegment at a time. The state machine 224 can repeat a job periodically to adapt to variations in the undesirable coupling 222, e.g., caused by changes in temperature, supply, or device aging. The interpolator block 226 can receive N number of data samples (of the sampled signal 216) from the sampler 212 and interpolate the corrected data samples (of the output signal 220) using a number of tap coefficients. In at least one embodiment, the interpolator block 226 can be a 3-tap feedforward equalizer (FFE). The 3-tap FFE can include a finite impulse response filter (FIR filter), such as a three-tap FIR filter. The three-tap FIR filter can have a main tap coefficient, 1, a second tap coefficient that is a negative version of an output offset value 234 (e.g., −c), and a third tap coefficient that is a positive version of the output offset value 234 (e.g., +c). For example, 1 is the main tap coefficient, −c is the pre-cursor tap coefficient, and +c is the post-cursor tap coefficient. The interpolator block 226 can receive the output offset value 234, c, from the register 232. The phase detector block 228 is coupled to an output of the interpolator block 226. The phase detector block 228 can be a transition-based phase detector, covering one subsegment. The phase detector block 228 can determine a phase error in the output signal 220. The phase detector block 228 can provide the phase error to the filter 230. The filter 230, which is coupled between the phase detector block 228 and the interpolator block 226 in a negative feedback loop, can receive the phase error from the phase detector block 228 and accumulate the phase error to obtain the output offset value 234 for each of the n number of subsegments. In short, the filter 230 can accumulate and dump, forming a negative feedback loop with the interpolator block 226. The register 232 can hold the output offset values of the filter 230. The register 232 can store the output offset value 234, which is output by the filter 230 after each of the n number of subsegments. The interpolator block 226 can receive the n output offset values 234 from the register 232. The interpolator block 226 can receive N number of data samples, and split into the n subsegments. Then each one is treated by one of the n output offset values 234 from the register 232. The values of the tap coefficients of the interpolator block 226 can be derived from the output offset values 234. In at least one embodiment, the n number of subsegments is 8 and the number of data samples, N, is 128. Alternatively, other numbers of subsegments and data samples can be used.

In other embodiments, the state machine 224 can be run once, periodically, or continuously. As described herein, the state machine 224 can cover one subsegment at a time or all at the same time. The state machine 224 can run once through all subsegments, or periodically go over each subsegment, or run continuously. It can be useful to go over each subsegment, one at a time, to save power, but periodically to adapt to changes in supply, temperature, and aging of components.

In at least one embodiment, the phase detector block 228 can perform multiple detections, referred to herein as subsegments within one DSP clock cycle, referred to as a segment. An output of each subsegment is accumulated by the filter 230 and drives the interpolator block 226 per subsegment in a closed loop. The interpolator block 226 can be a re-sampler that is driven per subsegment in a closed loop. For example, the DSP 200 can use a DSP clock 210 of 125 MHz and hence a segment length of 8 nanoseconds (ns), resulting in a phase detection for each 1 ns. Such a scheme would provide 8 corrections to the phase per segment and can thereby reasonably correct for a 125 MHz tone, should it inadvertently be coupled to the sampled signal 216. The filter 230 and interpolator block 226 (collectively referred to as an interpolator filter) can apply 8 separate phase corrections per segment. As such, the interpolator filter can perform sub-tone cancelation of phase noise. Other schemes are also possible, such as a single phase detection per segment, but then only subharmonics of the DSP clock 210 can be detected. Also, in another embodiment, instead of a negative feedback loop, a feedforward configuration could be used to detect and compensate for the periodic and synchronous phase error in the sampled signal 216.

In at least one embodiment, the interpolator block 226 is a re-sampling FFE block. The re-sampling block can be a three-tap FIR filter that receives a phase estimate value, k, also referred to herein as the output offset value 234, n. The re-sampling FFE block uses the phase estimate value, k for obtaining three samples (e.g., [−k, 1, k]) of the sampled signal 216, where 1 is the main tap coefficient, −k is the pre-cursor tap coefficient, and +k is the post-cursor tap coefficient. The re-sampled data can be further equalized using additional equalization and input into a symbol detector to determine the symbols of the data signal, as described herein. In at least one embodiment, a jitter correction circuit (or jitter correction block) can be used before or after the harmonic phase correction block 202. The jitter correction circuit can include an interpolator filter that re-samples the data samples to remove jitter from the data samples. In some embodiments, the components of the jitter correction circuit and the harmonic phase correction block 202 can be shared. For example, the phase detector block 228 can be used for both harmonic phase detection and compensation by the harmonic phase correction block 202 and jitter detection and compensation by the jitter correction block. For another example, the interpolator block 226 can be shared between the harmonic phase correction block 202 and the jitter correction block (JITX).

As described herein, the integrated circuit can include a clock source. The clock source can be the DCO 204. In at least one embodiment, the DCO 204 generates the DCO signal 206 having a third frequency higher than the first frequency of the DSP clock 210. The clock source can also be the DSP clock source 208. The harmonic phase correction block 202 can be used to detecting and remove a phase error that is periodic and synchronous to the sampler 212, such as the DCO signal 206 or the DSP clock 210, its harmonics (first harmonic sub-harmonics, super-harmonics), in a DSP-based SerDes (e.g., a SerDes IC). As described herein, the phase error can originate from an unintentional coupling into the power supply of the sampler 212 or into the sampled signal 216 (or analog signal 214) directly. A DSP is typically quite noisy on its core frequencies and that noise might deteriorate the sampled signal 216. The harmonic phase correction block 202 can detect this noise (phase error), quantify it, and compensate for it to improve link performance. The harmonic phase correction block 202 can also be used to detect and remove synchronous amplitude noise in a similar fashion.

In at least one embodiment, the clock source includes a digitally controlled oscillator (DCO) to generate a DCO signal having a third frequency higher than the first frequency. The periodic and synchronous phase error has the third frequency, where the third frequency is at least one of a first harmonic, a sub-harmonic, or a super-harmonic of the first frequency.

In at least one embodiment, the CDR circuit 218 is coupled to the ADC. In at least one embodiment, the signal processing circuit also includes a jitter correction block coupled between the ADC and the harmonic phase correction block 202. In at least one embodiment, the jitter correction block is coupled to an output of the harmonic phase correction block 202. The jitter correction block can re-sample the data samples to obtain re-sampled data samples based on a sampling offset to remove jitter from the data samples. In some cases, the interpolator can be shared between the jitter correction block and the harmonic phase correction block 202.

Figure 3:
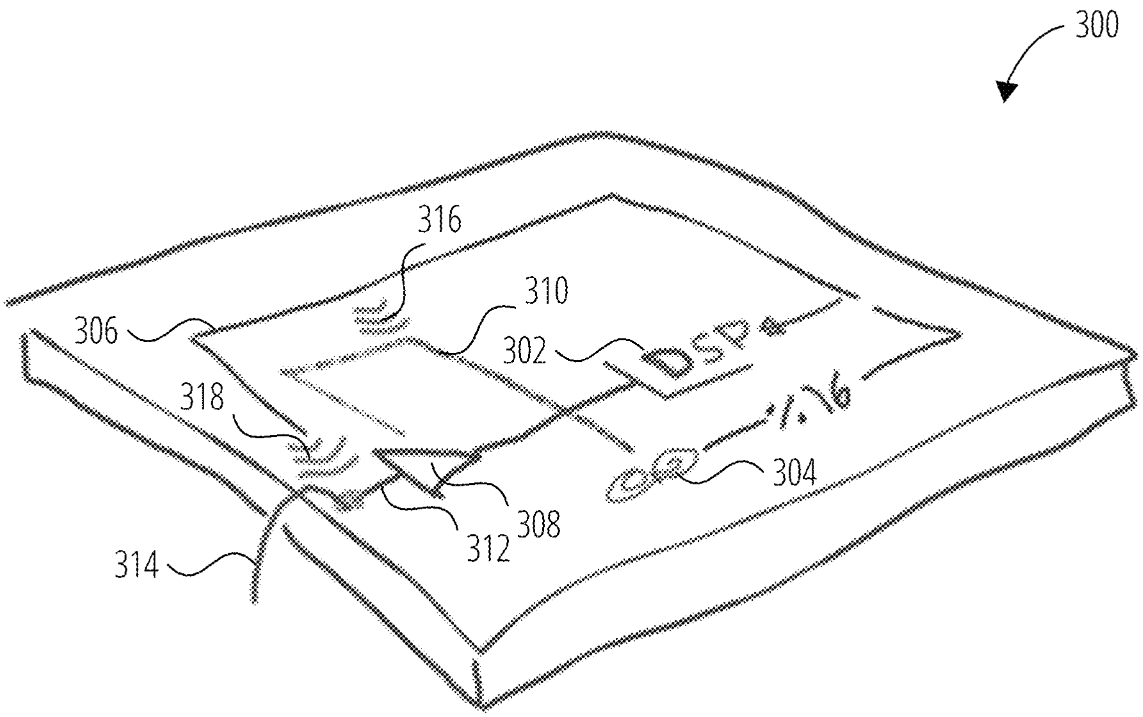
FIG. 3 illustrates an integrated circuit with undesired coupling between a clock source and a power supply grid or a signal path according to at least one embodiment.

FIG. 3 illustrates an integrated circuit 300 with undesired coupling 316 between a clock source 304 and a power supply grid 310 or a signal path 312 according to at least one embodiment. The integrated circuit 300 includes a DSP 302, a clock source 304, a DSP clock 306, a sampler 308, a power supply grid 310, and a signal path 312 coupled to a wire bond 314. The signal path 312 can be coupled to receive an incoming signal via the wire bond 314 or any other type of signal connector. The sampler 308 can sample an incoming signal on the signal path 312 and provide the sampled signal to the DSP 302. The sampler 308 can be powered by the power supply grid 310 on the integrated circuit 300. The clock source 304 can generate a DSP clock 306, such as using a frequency divider (e.g., ÷16). The DSP clock 306 can be routed to different parts of the integrated circuit 300, including the DSP 302. An undesired coupling 316 (or unintentional coupling) can be created between the DSP clock 306 and the power supply grid 310 of the sampler 308. An undesired coupling 318 can be created between the DSP clock 306 and the signal path 312 of the incoming signal. The DSP 302 can include the harmonic phase correction block 130 described above to detect and compensate for periodic and synchronous phase error introduced by the undesired coupling 316, the undesired coupling 318, or both. The harmonic phase correction block 130 can also detect undesired couplings with other periodic and synchronous noise sources on the integrated circuit 300 or external to the integrated circuit 300. As described herein the periodic and synchronous phase error can include a harmonic of the DSP clock 306, such as illustrated in the various signals of FIG. 4.

Figure 4:
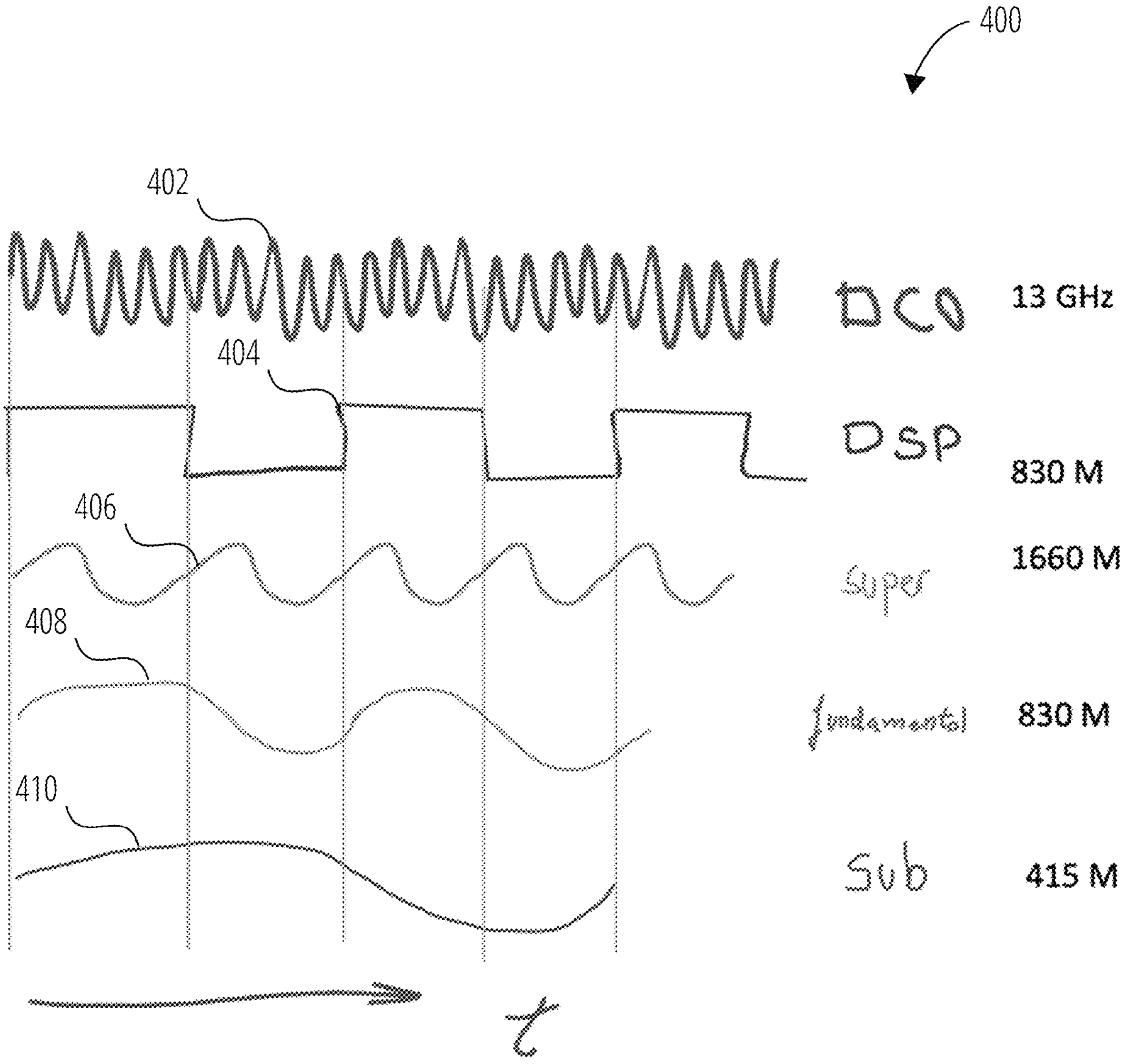
FIG. 4 is a graph of a digitally-controlled oscillator (DCO) signal, a DSP clock, and harmonics of the DSP clock according to at least one embodiment.

FIG. 4 is a graph 400 of a DCO signal 402, a DSP clock 404, and harmonics of the DSP clock 404 according to at least one embodiment. In this embodiment, the DCO signal 402 has a frequency of 13 GHz, and the DSP clock 404 (same as DSP clock 306 in FIG. 3) has a frequency of 830 MHz (e.g., DCO's frequency÷16). The periodic and synchronous phase error can have a harmonic of the frequency of the DSP clock 404. The periodic and synchronous phase error can have a first harmonic 408 of the DSP clock 404. The periodic and synchronous phase error can have a super-harmonic 406 of the DSP clock 404. The periodic and synchronous phase error can have a sub-harmonic 410 of the DSP clock 404. In other embodiments, the periodic and synchronous phase error can have different combinations of one or more of the first harmonic, sub-harmonics, or super-harmonics of the frequency of the DSP clock 404.

Figure 6:
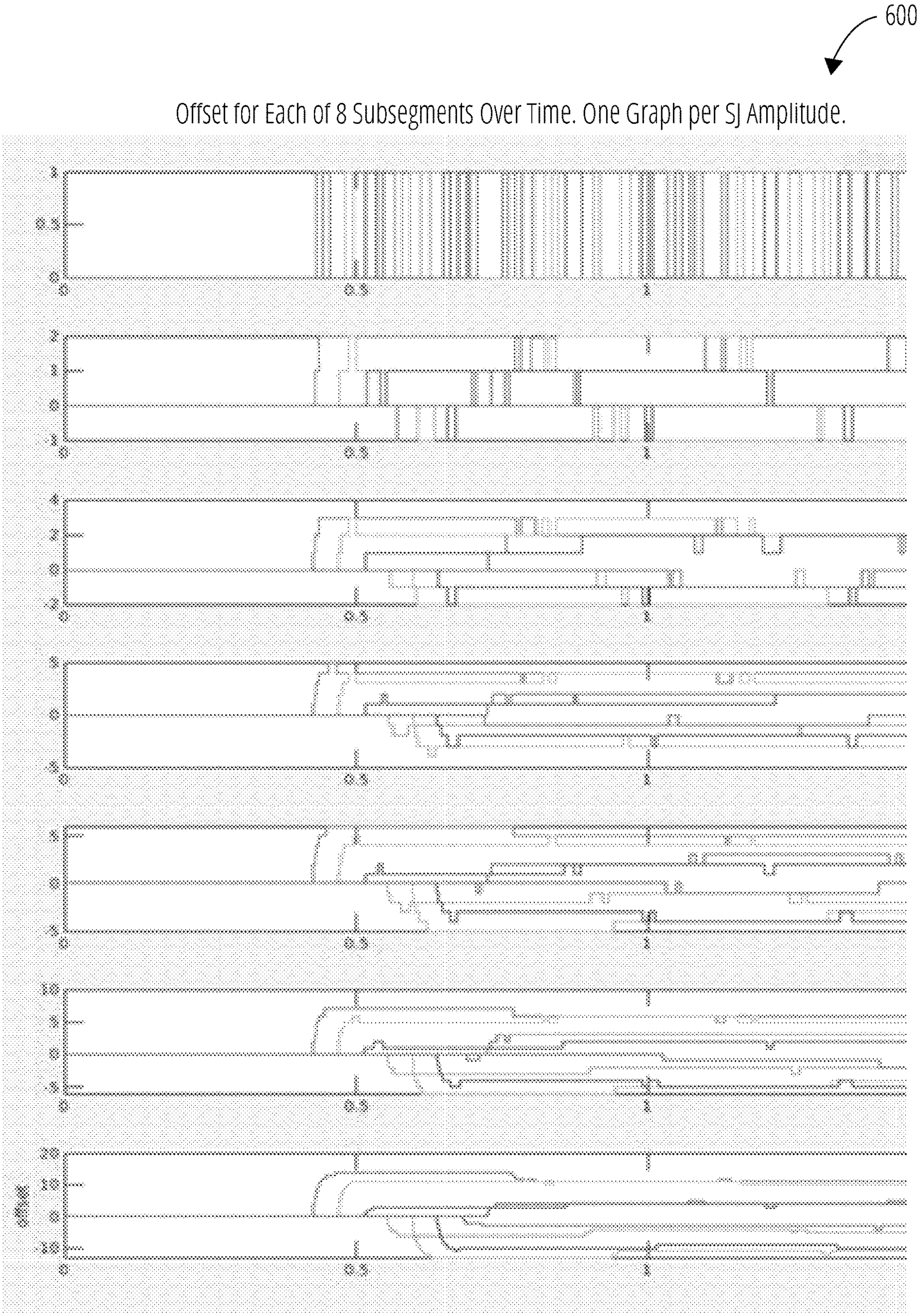
FIG. 6 are graphs of an offset for each of the eight subsegments over time per SJ amplitude according to at least one embodiment.
Figure 7:
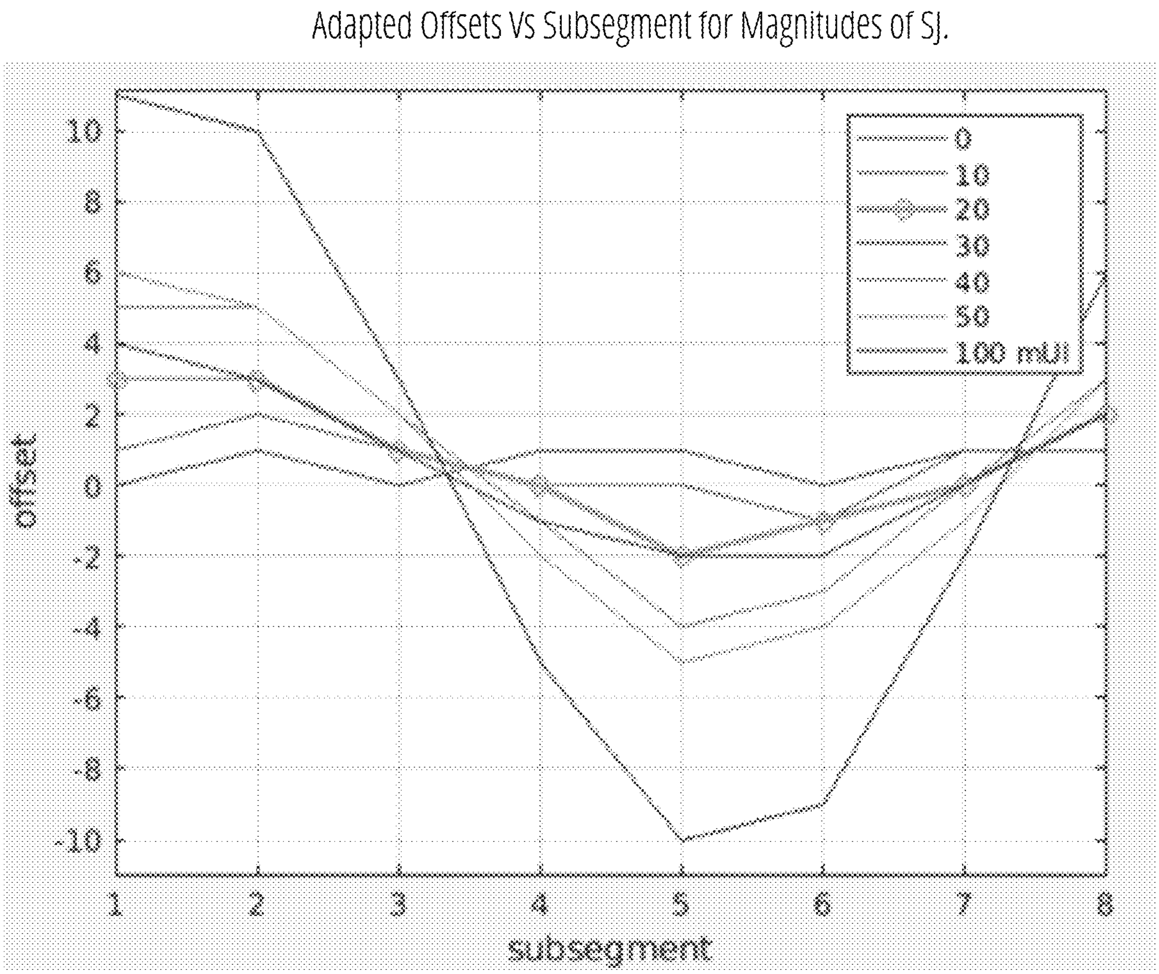
FIG. 7 is a graph illustrating adapted offsets versus subsegments for magnitudes of SJ amplitude according to at least one embodiment.
Figure 8:
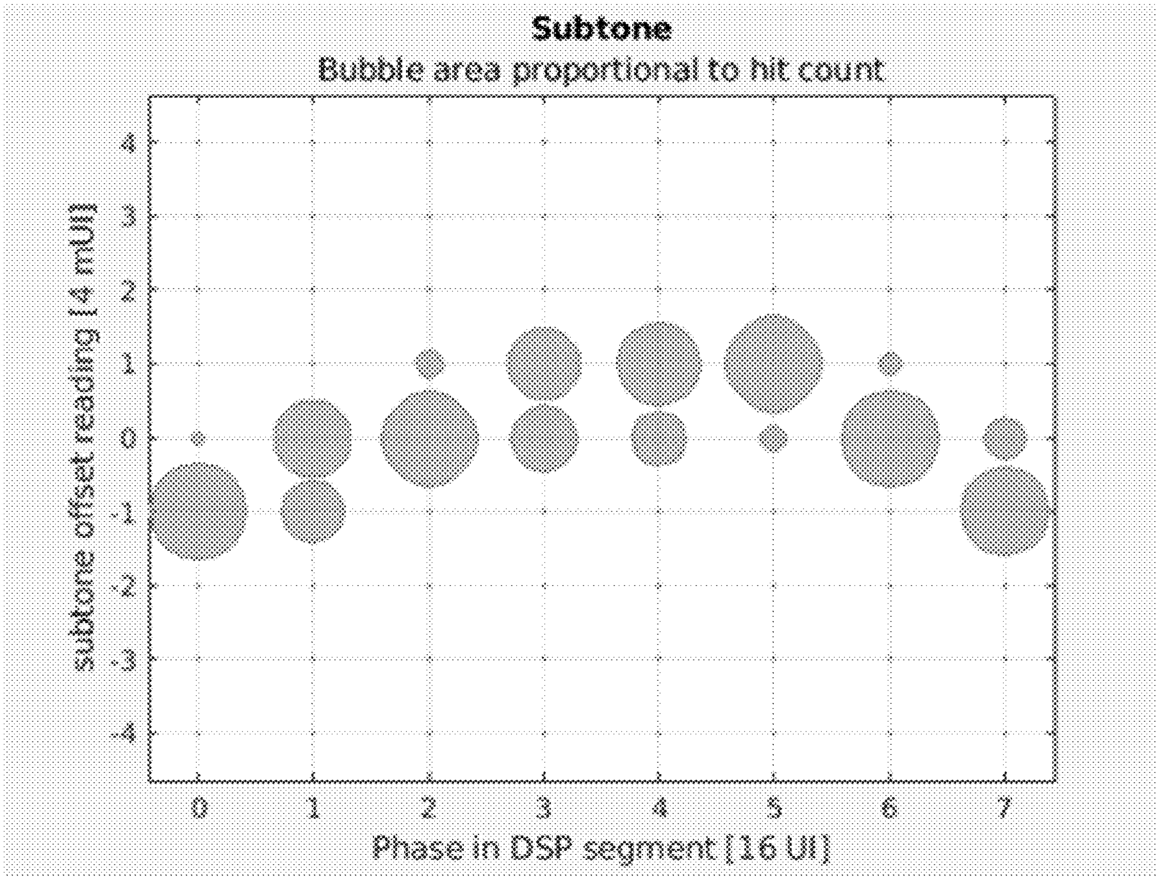
FIG. 8 is a graph of measurements on silicon of a synchronous phase modulation with frequency of the DSP clock and a first overtone at double the frequency being detected according to at least one embodiment.

FIG. 6, FIG. 7, and FIG. 8 describe and illustrate a simulated adaptation of 8 offsets, one per each of 8 subsegments per DSP clock, including one figure with measurement results on actual silicon. In the simulation, an input signal to the receiver has been purposely overlaid with a sinusoidal phase modulation (SJ) at the same frequency as a DSP clock. The SJ emulates the undesirable coupling of the DSP clock on to the input signal.

Figure 5:
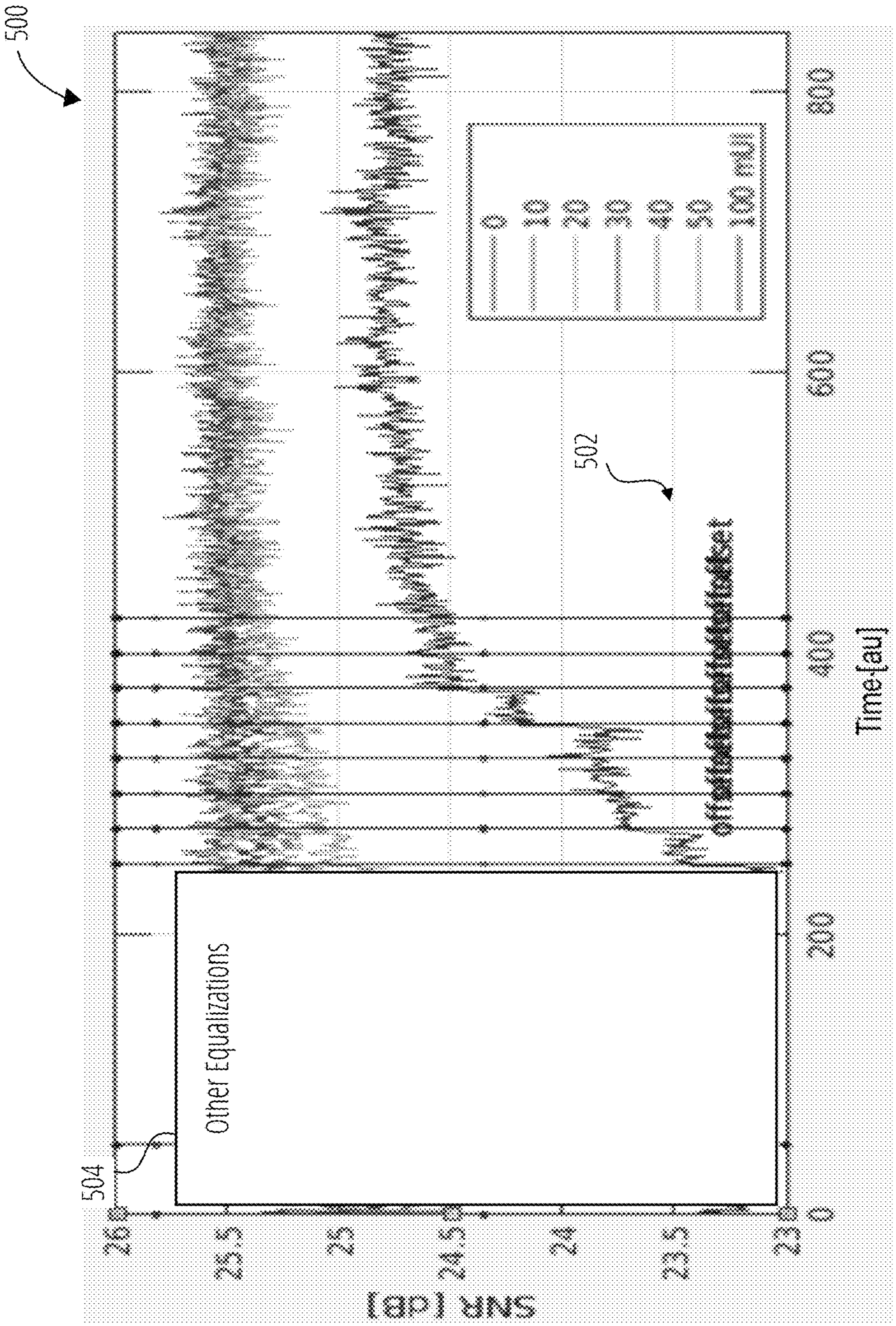
FIG. 5 is a graph illustrating a signal-to-noise ratio (SNR) over time for increasing peak-to-peak amplitude of a sinusoidal phase modulation (SJ) with offsets per subsegment being adapted at multiple times according to at least one embodiment.

FIG. 5 is a graph 500 illustrating a signal-to-noise ratio (SNR) over time for increasing peak-to-peak amplitude of a sinusoidal phase modulation (SJ) with offsets per subsegment 502 being adapted one by one (represented by the vertical lines) according to at least one embodiment.

FIG. 6 are graphs 600 of an offset for each of the eight subsegments over time per SJ amplitude according to at least one embodiment. The offset shown in FIG. 6 correspond to the output offset values stored in the register 232 of the harmonic phase correction block 202.

FIG. 7 is a graph 700 illustrating adapted offsets versus subsegments for magnitudes of SJ amplitude according to at least one embodiment. The adapted offsets shown in FIG. 7 correspond to the output offset values stored in the register 232 of the harmonic phase correction block 202.

FIG. 8 is a graph 800 of measurements on silicon of a synchronous phase modulation with frequency of a DSP clock and a first overtone at double the frequency being detected according to at least one embodiment.

Figure 9:
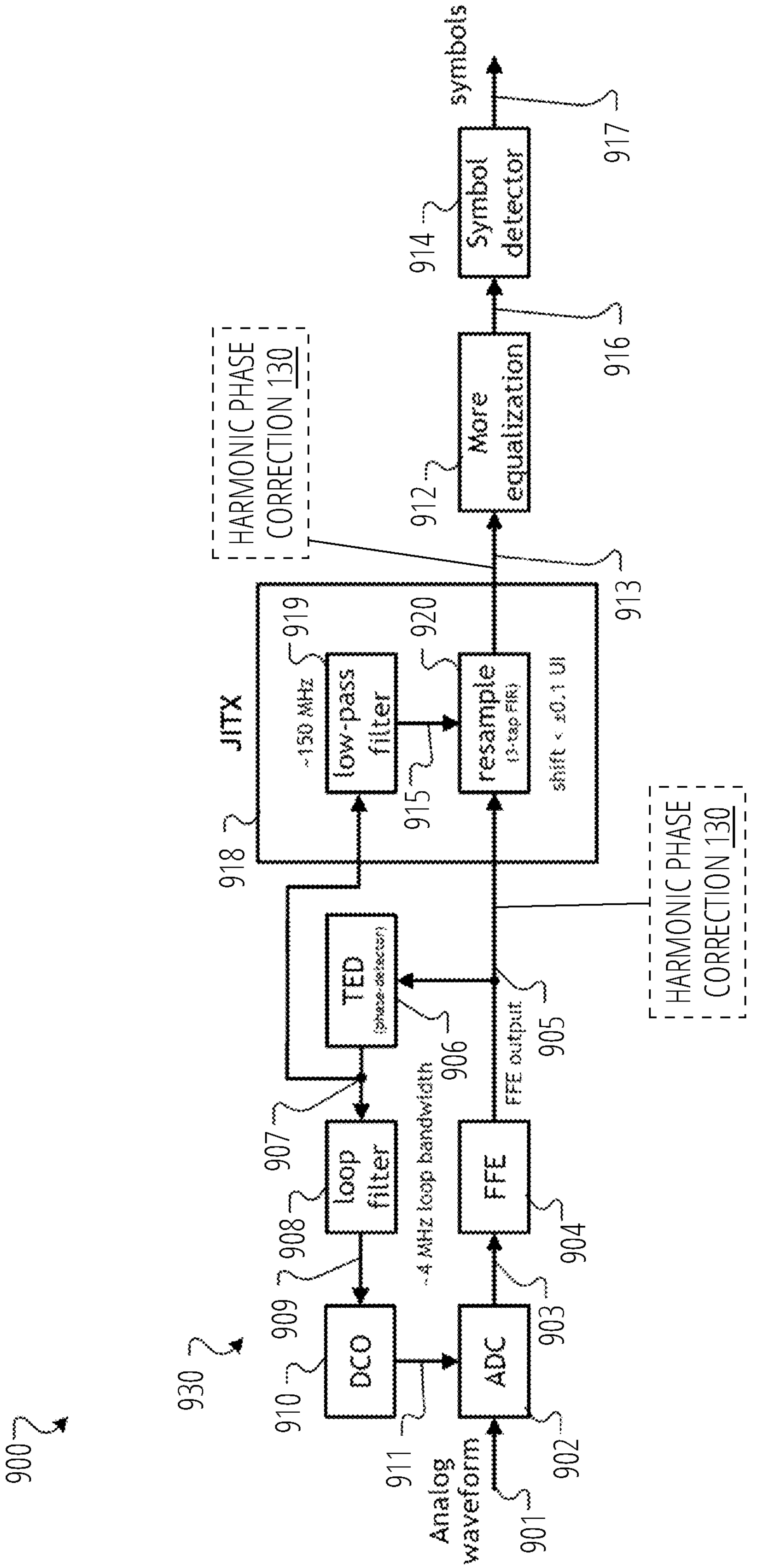
FIG. 9 is a block diagram of a receiver with a jitter correction block, according to at least one embodiment.

FIG. 9 is a block diagram of a receiver 900 with a jitter extraction and jitter correction block 918, according to at least one embodiment. The receiver 900 includes an ADC 902 and a digital signal processing circuit 903, including one or more digital processing blocks. In the illustrated embodiment, the digital signal processing circuit 930 includes an equalizer block 904, a timing error detector (TED) 906, a loop filter 908, a controlled oscillator 910 (e.g., DCO, VCO, or the like), the jitter extraction and jitter correction block 918, additional equalization block 912, and symbol detector 914.

The ADC 902 receives an incoming signal 901. The incoming signal 901 can be analog. The ADC 902 samples the incoming signal 901 and generates samples 903. The equalizer block 904 receives the samples 903 and generates an equalizer output 905 (or a reduced bandwidth signal for e.g., a DFE or a MLSE)). The equalizer output 905 can be an equalized signal. In at least one embodiment, the equalizer block 904 is a feedforward equalizer (FFE) block that generates an FFE output. In another embodiment, the equalizer block 904 includes a Continuous-Time Linear Equalizer (CTLE) and an FFE. In another embodiment, the equalizer block 904 includes only the CTLE or only the FFE. In another embodiment, other types of equalizer blocks can be used. The digital signal processing circuit 930 can include a clock recovery (CR) block with TED 906. In another embodiment, the digital signal processing circuit 930 includes a clock and data recovery (CDR) block with TED 906. In other embodiments, a phase detector (PD) block is used instead of TED 906, as described herein.

The TED 906 measures a sampling offset 907 at the equalizer output 905 (FFE output). In another embodiment, the TED 906 measures a phase offset or other phase information of the equalizer output 905. For example, the sampling offset 907 can be a phase offset of current data. The sampling offset 907 (or the phase offset or phase information), measured by TED 906, can be used to control sampling by the ADC 902. In particular, the sampling offset 907 can be filtered by the loop filter 908 to generate a filtered sampling offset 909. The controlled oscillator 910 receives the filtered sampling offset 909 and generates a control signal 911 to control the sampling by the ADC 902. The control signal 911 can be a sampling clock of the ADC 902. The CR block can be part of a clock recovery loop in at least one embodiment. The clock recovery loop can be a closed-loop feedback loop. The CR block can include TED 906, a loop filter 908, and a controlled oscillator 910. The CR block uses the measurements by TED 906 to control the controlled oscillator 910 for sampling future data (future FFE data). In another embodiment, the CR block or the clock recovery loop can include other additional components or can be organized in other configurations. In at least one embodiment, the controlled oscillator 910 is a DCO. In another embodiment, the controlled oscillator 910 is a VCO. In at least one embodiment, the CR block can operate at a loop bandwidth of a first frequency to track the jitter. That is, the CR block can track and remove jitter less than the first frequency (low-frequency below the loop bandwidth) using the phase timing variation measured by TED 906. As described above, the jitter above the loop bandwidth is untracked. In at least one embodiment, the loop bandwidth is approximately 4 MHz. Alternatively, the loop bandwidth can be other frequencies. The controlled oscillator 910 can have higher phase noise than desired. One remedy is to increase the loop bandwidth in the clock recovery loop. However, the total loop delay makes it difficult to increase the clock recovery loop bandwidth without getting peaking in the jitter transfer. The TED 906 can be a type of phase detector (PD) that generates valid phase information about the jitter, but the phase information cannot be used in the clock recovery loop due to the loop delay. The control of the controlled oscillator 910 can be additionally delayed due to the loop delay. A first slicer can be used right after the equalizer block 904. The first slicer can conduct preliminary data decoding after the equalization. The decoded data and the errors, combined in the same place, are used for clock recovery. A second slicer (e.g., symbol detector 914) can decode the data after additional equalization block 912. The final decisions here are not used for clock recovery. In at least one embodiment, the jitter extraction and jitter correction block 918 can use the unused (residual) information from the TED 906 (phase detector) to correct data at the symbol detector 914 (e.g., a final slicer, a Decision Feed-Back Equalizer (DFE), a Maximum Likelihood Sequence Estimator (MLSE), or other optimal or approximate decision algorithms). This should allow the use of phase data in a bandwidth independent of the clock recovery loop delay since the phase data is only fed forward to the signal after the CR block. The CR block will thus take care of the low-frequency (below the loop bandwidth) phase timing variations, followed by a timing correction before final symbol detection by symbol detector 914 (e.g., final slicing by a DFE or an MLSE).

In at least one embodiment, the equalizer block 904 receives the samples 903 and outputs current data based on the samples. The CR block, including the TED 906, can measure the sampling offset 907 of the current data to control the sampling of subsequent data by the ADC 902. The jitter extraction and jitter correction block 918 can receive the current data, and the sampling offset 907 corresponds to the current data. The jitter extraction and jitter correction block 918 uses measurements by the TED 906 to re-sample the current data (current FFE data) to obtain re-sampled data 913 based on the sampling offset 907 to remove jitter from the current data. In another embodiment, the jitter extraction and jitter correction block 918 can be placed later in the equalizer chain.

In at least one embodiment, the jitter extraction and jitter correction block 918 can include a filter 919 (e.g., a low-pass filter) that takes the output from the TED 906 and makes a best estimate of the timing error at the time and forgets the phase information that is corrected by the CR block with a delay. In some cases, this can be considered a lowpass filtering of the phase delay estimates. In at least one embodiment, the filter 919 filters the sampling offset 907 to obtain a filtered sampling offset 915. In at least one embodiment, the filter 919 is an FIR filter. In another embodiment, the filter 919 is a running average block. The running average block can be a special case of an FIR filter.

In at least one embodiment, the jitter extraction and jitter correction block 918 includes a re-sample block 920. The re-sample block can re-sample the current data to obtain re-sampled data 913 using the filtered sampling offset 915. In at least one embodiment, to apply the correction, an anti-symmetric multi-tap FFE (e.g., c=[−k, 1, +k]) can be applied to the current data before the symbol detector 914 (e.g., MLSE). This timing correction works particularly well in a reduced bandwidth receiver (less aliasing) employing a DFE and MLSE or similarly. In at least one embodiment, the filter 919 can operate at a second frequency greater than the first frequency of the clock recovery loop. For example, the second frequency can be approximately 150 MHz. Alternatively, the second frequency can be other frequencies.

In at least one embodiment, the re-sample block 920 can include an interpolation function. In at least one embodiment, the re-sample block 920 can include an FIR filter. In at least one embodiment, the FIR filter is a multi-tap FIR filter, such as a 3-tap FIR filter, a 5-tap FIR filter, or other FIR filters with additional taps. In at least one embodiment, the jitter extraction and jitter correction block 918 includes a delay element coupled between the FFE output 905 of the equalizer block 904 and the re-sample block 920. In at least one embodiment, the delay element can delay the current data to align the current data with the sampling offset 907 (phase-offset value) corresponding to the current data.

In at least one embodiment, the jitter extraction block 918 includes an estimator block to determine an average phase offset over a specified time by multiplying a measurement of an instantaneous phase offset during a number of clock cycles by a first parameter value to obtain a running sum. In at least one embodiment, the jitter extraction block 921 includes a phase detector gain block to determine a phase-offset value based on the running sum average phase offset value. The jitter extraction block 921 includes a delay block to delay the current data to align the current data with the phase-offset value corresponding to the current data. The re-sample block re-samples the current data using the phase-offset value to obtain the re-sampled data 913.

In at least one embodiment, the digital signal processing circuit 930 further includes an additional equalization block 912 to further equalize the re-sampled data 913 to equalized data 916 fed into the symbol detector 914. In at least one embodiment, the symbol detector 914 is a slicer. In another embodiment, the symbol detector 914 includes an MLSE block. The symbol detector 914 outputs the symbols 917.

As described above, the harmonic phase correction block 130 can be used in connection with the jitter correction block 918 (JITX). The harmonic phase correction block 130 can be located in series before or after the jitter correction block 918. As described above, the jitter correction block 918 and harmonic phase correction block 130 can share common components.

In at least one embodiment, a SerDes IC can include a signal processing unit, a clock and data recovery (CDR) circuit, an ADC, a feedforward jitter correction circuit, and a harmonic phase correction block. The signal processing circuit can have a clock signal having a first frequency. The CDR circuit can include a phase detector to determine phase information about a transmit clock used to transmit a signal to the SerDes IC. The ADC can sample an incoming signal using a sampling clock to obtain data samples. The CDR circuit can control the sampling clock in a closed-loop fashion using the phase information. The feedforward jitter correction circuit, which is coupled to the CDR circuit, can control, using the phase information, a re-sampling clock in an open-loop fashion to compensate for sampling jitter above a loop bandwidth of the clock and data recovery circuit. The harmonic phase correction block, which is coupled to the feedforward jitter correction circuit, can detect and compensate for a periodic and synchronous phase error in data samples to obtain corrected data samples. The periodic and synchronous phase error can be caused by the clock signal. The periodic and synchronous phase error has a harmonic of the first frequency.

In at least one embodiment, the harmonic phase correction block includes a state machine, an interpolator block, a phase detector block, a filter, and a register. The state machine can output a control signal at each of n number of subsegments of a clock cycle of the clock signal. The interpolator block can receive N number of data samples and interpolate the corrected data samples using a number of tap coefficients. The phase detector block, which is coupled to the output of the interpolator block, can determine a phase error. The filter, which is coupled between the phase detector block and the interpolator block in a negative feedback loop, can receive the phase offset from the phase detector block and accumulate the phase error to obtain an output offset value for each of the n number of subsegments. The register can store the output offset value output by the filter after each of the n number of subsegments. The interpolator block can receive the output offset value from the register. The value of the tap coefficients are derived from the output offset value.

In at least one embodiment, the ADC is a sub-sampled ADC. In at least one embodiment, the interpolator block includes a three-tap FFE. In at least one embodiment, the phase detector block includes a transition-based phase detector covering one subsegment of the n number of subsegments. In at least one embodiment, the state machine can step through the n number of subsegments and update the register one at a time. The filter can accumulate the phase error of one subsegment of the n number of subsegments to obtain the output offset value and update the output offset value after storing in the register.

Figure 10A:
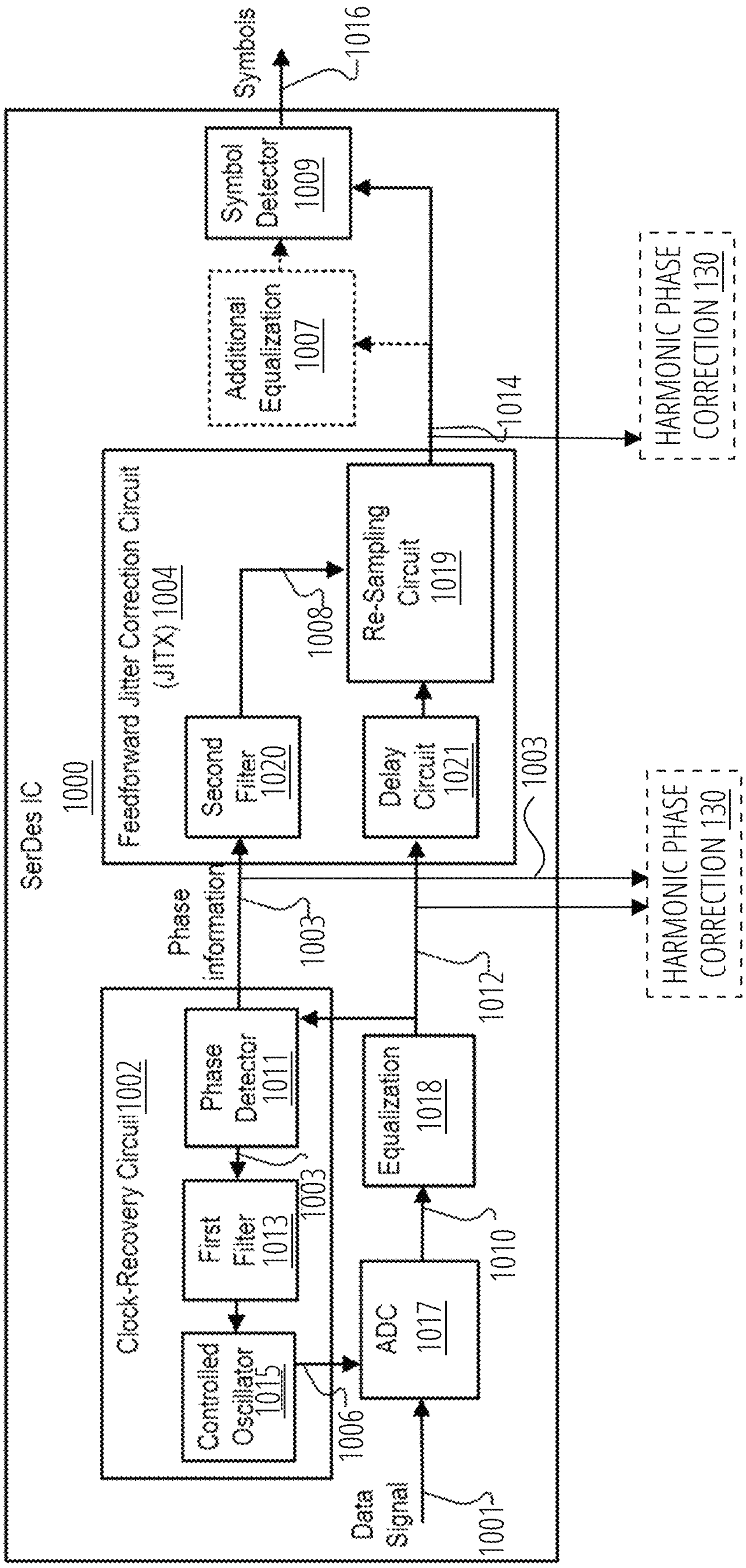
FIG. 10A is a block diagram of a Serializer-Deserializer (SerDes) integrated circuit (IC) with a feedforward jitter correction circuit, according to at least one embodiment.

FIG. 10A is a block diagram of a SerDes IC 1000 with a feedforward jitter correction circuit JITX 1004, according to at least one embodiment. SerDes IC 1000 can be a transceiver that converts parallel data to serial data and vice versa. SerDes IC 1000 can facilitate transmission between two devices over serial streams, reducing the number of data paths, wires/traces, terminals, etc. SerDes IC 1000 includes a clock and data recovery circuit 1002 and a JITX 1004. The clock and data recovery circuit 1002 can be coupled to an ADC 1017 and an equalization block 1018. The JITX 1004 can be coupled to an output of the clock and data recovery circuit 1002. In another embodiment, SerDes IC 1000 can include additional equalization block 1007 before a symbol detector 1009. In at least one embodiment, the additional equalization block 1007 is coupled to the output of the JITX 1004 before the symbol detector 1009. In another embodiment, the feedforward jitter correction circuit 1004 is coupled to an output of the additional equalization block 1007 before the symbol detector 1009. In at least one embodiment, the clock and data recovery circuit 1002 includes a phase detector 1011 to determine phase information 1003 about a transmit clock used to transmit a data signal 1001 to the SerDes IC 1000. The clock and data recovery circuit 1002 uses the phase information 1003 from the phase detector 1011 to control a receiver sampling clock 1006 in a closed-loop fashion. The clock and data recovery circuit 1002 receives the data signal 1001 and uses the phase information 1003 to determine or adjust the receiver sampling clock 1006 for subsequent data in the data signal 1001. The JITX 1004 uses the phase information 1003 to control a re-sampling clock 1008 in an open-loop fashion to compensate for sampling jitter above a loop bandwidth of the clock and data recovery circuit 1002.

In at least one embodiment, the clock and data recovery circuit 1002 includes a feedback loop with the phase detector 1011, a first filter 1013, and a controlled oscillator (CO) 1014 in a closed feedback loop. The CO 1014 can be a DCO, a VCO, or the like, as described herein. The ADC 1017 generates samples 1010 of the data signal 1001 using the receiver sampling clock 1006. The equalization block 1018 determines current data based on the samples 1010 and provides an equalization output 1012. The equalization output 1012 is also used by the phase detector 1011 to determine the phase information. The phase detector 1011 can measure a phase offset corresponding to the current data. The first filter 1013 can filter the phase offset and control the CO 1014 based on the filtered phase offset. The clock and data recovery circuit 1002 can operate with a loop bandwidth at a first frequency (e.g., 4 MHz). The CO 1014 can provide the receiver sampling clock 1006 based on an output of the first filter 1013.

In at least one embodiment, the JITX 1004 includes a second filter 1020 and a re-sampling circuit 1019. The second filter 1020 can receive the phase information 1003 from the phase detector 1011. The second filter 1020 can filter the phase offset to remove the sampling jitter above the first frequency to obtain a filtered phase offset. In at least one embodiment, the second filter 1020 can be a running average filter, an FIR filter (e.g., a weighted average), a Kalman filter, or the like. In another embodiment, the second filter 1020 is an estimator block that determines an average phase offset over a specified time. The estimator can multiply a measurement of an instantaneous phase offset during a number of clock cycles by a first parameter (e.g., averaging length). The filtered phase offset can be the re-sampling clock 1008 or used to generate the re-sampling clock 1008 used to re-sample the current data. For example, a phase detector gain block can determine a phase-offset value based on the average phase offset value. The phase detector gain block can convert the average phase offset in terms of a running sum into the phase offset values used by the re-sampling circuit 1019. The re-sampling circuit 1019 can receive the equalization output 1012 and re-samples the equalization output 1012 to obtain re-sampled data 1015. In another embodiment, the JITX 1004 includes a delay circuit 1021 that delays the equalization output 1012 before the re-sampling circuit 1019. This can be done to align the phase information 1003 with the current data, given the delay in the clock and data recovery circuit 1002. The re-sampled data 1015 can be input into the symbol detector 1009 to generate symbols 1016. In another embodiment, the re-sampled data 1015 can be input into the additional equalization block 1007 before being input into the symbol detector 1009.

In at least one embodiment, the second filter 1020 determines an average phase offset based on a number of phase offset measurements and multiplies the average phase offset by a phase detector gain to obtain the re-sampling clock 1008. In at least one embodiment, the re-sampling circuit 1019 includes a multi-tap finite impulse response filter (FIR) filter (e.g., 3-tap or 5-tap FIR filter).

As described above, the harmonic phase correction block 130 can be used in connection with the JITX 1004. The harmonic phase correction block 130 can be located in series before or after the JITX 1004. As described above, the JITX 1004 and harmonic phase correction block 130 can share common components.

Figure 10B:
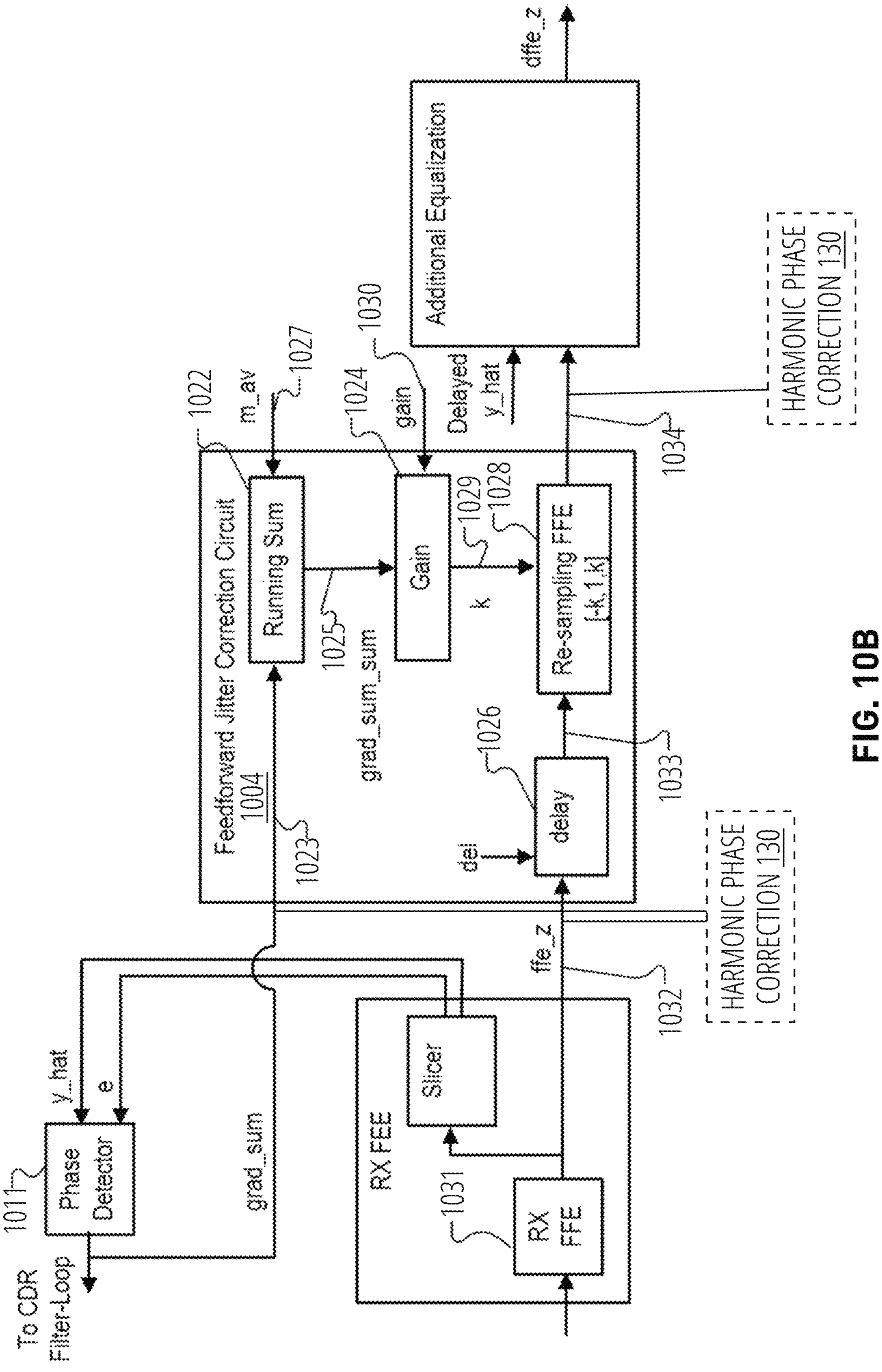
FIG. 10B is a block diagram of a feedforward jitter correction circuit, according to at least one embodiment.

FIG. 10B is a block diagram of a feedforward jitter correction circuit JITX 1004, according to at least one embodiment. The JITX 1004 of FIG. 10B includes a running sum block 1022, a gain block 1024, a delay block 1026, and a re-sampling FFE block 1028. As described above, the phase detector 1011 can generate phase information. In this embodiment, the phase detector 1011 can output an up-down sum value 1023 (updown_sum). The up-down sum value 1023 is the sum of all ups less the sum of all downs. For example, the value can range between [−64, +64]. The up-down sum value 1023 can be a measurement of the instantaneous phase offset during the last number of clock cycles (e.g., 64 T). The running sum block 1022 can receive the up-down sum value 1023 and determine a running average 1025 (updown_sum_sum) of the up-down sum values 1023 over time. In at least one embodiment, the running sum block 1022 can receive a first parameter 1027, averaging length, m_av. In at least one embodiment, the first parameter 1027 is 6. Alternatively, other values can be used for the first parameter 1027. The first parameter 1027 can be multiplied by the number of clock cycles (e.g., 64 T) to obtain an amount of time over which the running average 1025 is determined (e.g., 6·64 T=3.61 ns=(277 MHz)$^{-1}$). The gain block 1024 receives the running average 1025 and determines a phase estimate value 1029, k. In at least one embodiment, the gain block 1024 can receive a second parameter 1030, referred to as a phase detector gain (gain =scale/m_av). The phase detector gain is the scale divided by the first parameter 1027 (averaging length). The phase detector gain can be used to convert from a domain used for the up-down sum values (up-down sum) to phase offsets. In at least one embodiment, the scale is 0.008. Alternatively, other scale values can be used. In at least one embodiment, the phase detector gain depends on a pattern selection table, inter-symbol interference (ISI), noise, or the like.

The JITX 1004 receives an FFE output 1032 from an equalization block (e.g., 1031). The FFE output 1032 is delayed by the delay block 1026 to align with the corresponding phase information measured by the phase detector 1011. The delay block 1026 outputs a delayed FFE output 1033 to the re-sampling FFE block 1028. In at least one embodiment, the delay block 1026 receives a third parameter (del=3). In at least one embodiment, the third parameter is the delay of the running average 1025, which is half of the averaging length (first parameter 1027). In at least one embodiment, the third parameter can be used to obtain alignment between FFE output 1032 (ffe_out) and phase estimate (updown_sum_sum). The delayed FFE output 1033 is re-sampled by the re-sampling FFE block 1028 to obtain re-sampled data 1034. In at least one embodiment, the re-sampling FFE block 1028 is a three-tap FIR filter that receives the phase estimate value 1029, k. The re-sampling FFE block 1028 uses the phase estimate value 1029, k for obtaining three samples (e.g., [−k, 1, k]) of the delayed FFE output 1033. The re-sampled data 1034 can be further equalized using additional equalization and input into a symbol detector to determine the symbols of the data signal, as described herein.

As described above, the harmonic phase correction block 130 can be used in connection with the JITX 1004. The harmonic phase correction block 130 can be located in series before or after the JITX 1004. As described above, the JITX 1004 and harmonic phase correction block 130 can share common components.

Figure 11:
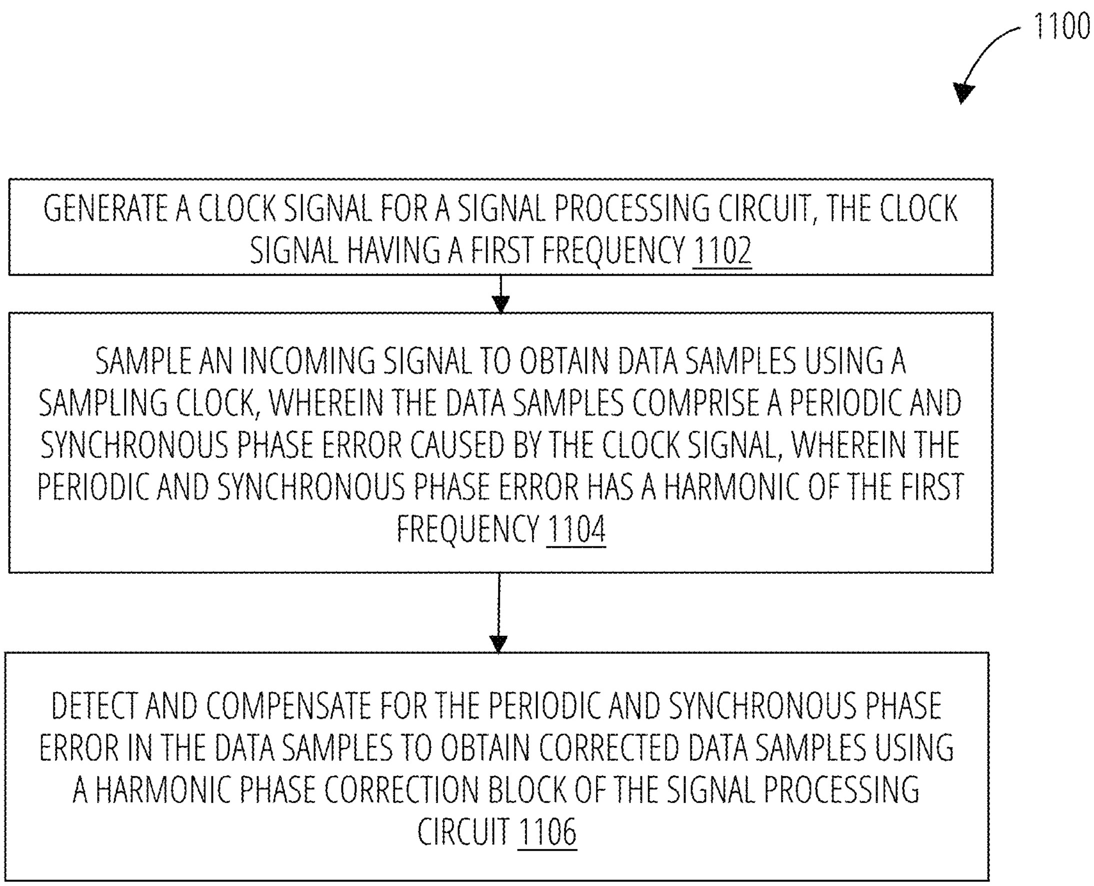
FIG. 11 is a flow diagram of a method for detecting and compensating for periodic and synchronous phase error according to at least one embodiment.

FIG. 11 is a flow diagram of a method 1100 for detecting and compensating for periodic and synchronous phase error according to at least one embodiment. The method 1100 can be performed by processing logic comprising hardware, software, firmware, or any combination thereof. In at least one embodiment, the method 1100 is performed by any one of device 112 or device 114 of receiver 104 or receiver 106 of FIG. 1A or receiver 104 of FIG. 1B. In at least one embodiment, the method 1100 is performed by the DSP 200 of FIG. 2. In at least one embodiment, the method 1100 is performed by harmonic phase correction block 202 of FIG. 2. In another embodiment, the method 1100 is performed by SerDes IC 1000 of FIG. 10A. In yet another embodiment, the method 1100 is performed by feedforward jitter correction circuit 1004 of FIG. 10B.

Referring to FIG. 11, the method 1100 begins with the processing logic generating a clock signal for a signal processing circuit, the clock signal having a first frequency (block 1102). At block 1104, the processing logic samples an incoming signal to obtain data samples using a sampling clock. The data samples comprise a periodic and synchronous phase error caused by the clock signal. The periodic and synchronous phase error has a harmonic of the first frequency. At block 1106, the processing logic detects and compensates for the periodic and synchronous phase error in the data samples to obtain corrected data samples using a harmonic phase correction block of the signal processing circuit.

In a further embodiment, the processing logic receives the incoming signal over a signal connection (e.g., wire bond or other type of signal connection). The periodic and synchronous phase error originates from an undesired coupling from the clock signal into a power supply grid or from the clock signal into the incoming signal itself. The processing logic can detect and compensate for the periodic and synchronous phase error by generating a control signal, using a state machine of the harmonic phase correction block, at each of n number of subsegments of a clock cycle of the clock signal, receiving N number of the data samples and interpolating the corrected data samples using a number of tap coefficients of an interpolator block of the harmonic phase correction block, determining a phase offset of an output of the interpolator block, accumulating the phase offset to obtain an output offset value for each of the n number of subsegments, and storing the output offset value in a register after each of the n number of subsegments. The values of the tap coefficients are derived from the output offset value. In at least one embodiment, N is equal to 128 and n is equal to 8.

In a further embodiment, before detecting and compensating for the periodic and synchronous phase error, the processing logic re-samples the data samples to obtain re-sampled data samples based on a sampling offset to remove jitter from the data samples.

In at least one embodiment, after detecting and compensating for the periodic and synchronous phase error, the processing logic re-samples the data samples to obtain re-sampled data samples based on a sampling offset to remove jitter from the data samples.

Figure 12:
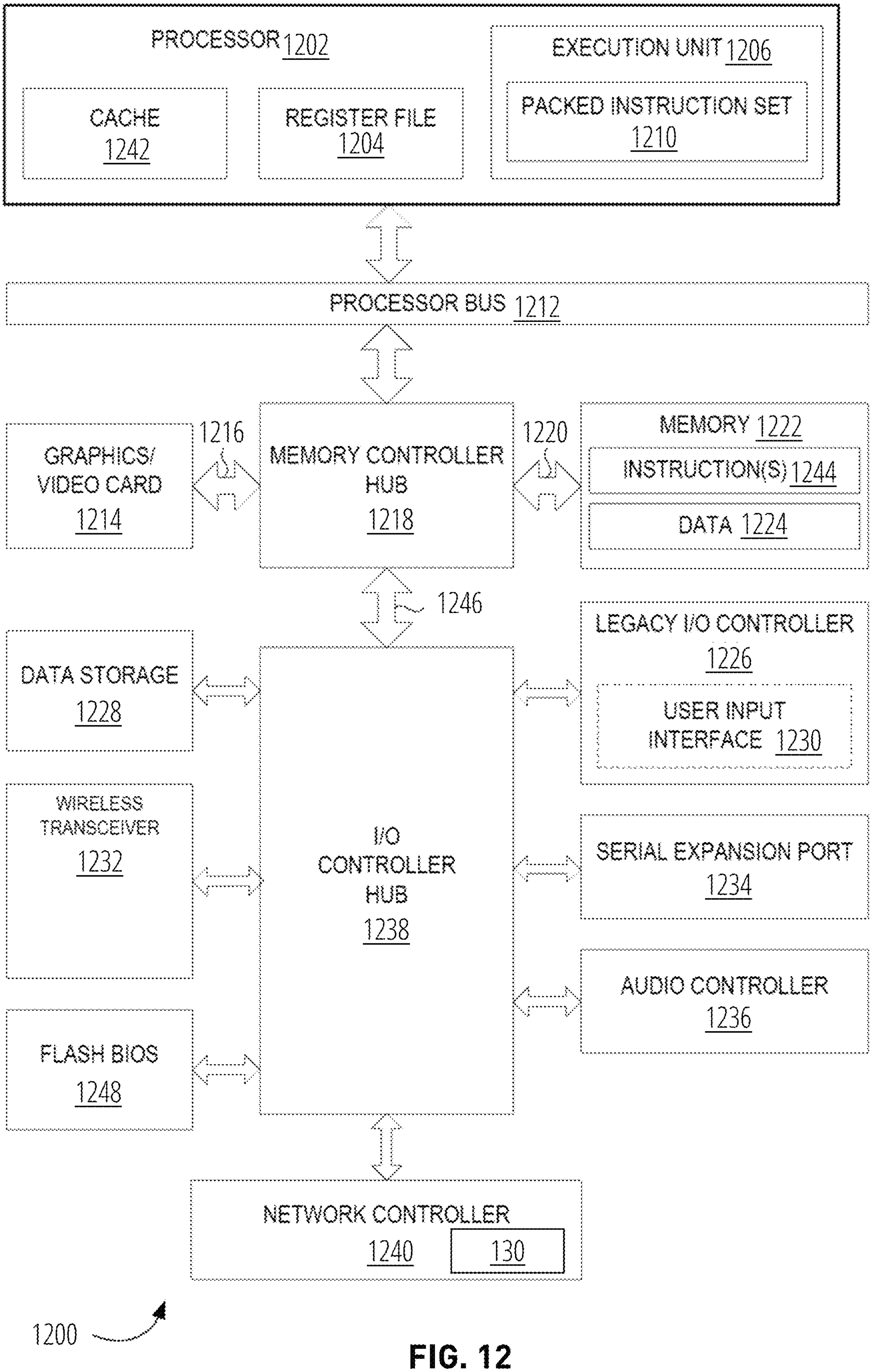
FIG. 12 illustrates an example computer system including a harmonic phase correction block according to at least one embodiment.

FIG. 12 illustrates an example computer system 1200, including a harmonic phase correction block 130, in accordance with at least some embodiments. In at least one embodiment, computer system 1200 may be a system with interconnected devices and components, an SOC, or some combination. In at least one embodiment, computer system 1200 is formed with a processor 1202 that may include execution units to execute an instruction. In at least one embodiment, computer system 1200 may include, without limitation, a component, such as a processor 1202, to employ execution units including logic to perform algorithms for processing data. In at least one embodiment, computer system 1200 may include processors, such as PENTIUM® Processor family, Xeon™, Itanium®, XScale™ and/or StrongARM™, Intel® Core™, or Intel® Nervana™ microprocessors available from Intel Corporation of Santa Clara, California, although other systems (including PCs having other microprocessors, engineering workstations, set-top boxes and like) may also be used. In at least one embodiment, computer system 1200 may execute a version of WINDOWS' operating system available from Microsoft Corporation of Redmond, Wash., although other operating systems (UNIX and Linux, for example), embedded software, and/or graphical user interfaces, may also be used.

In at least one embodiment, computer system 1200 may be used in other devices such as handheld devices and embedded applications. Some examples of handheld devices include cellular phones, Internet Protocol devices, digital cameras, personal digital assistants ("PDAs"), and handheld PCs. In at least one embodiment, embedded applications may include a microcontroller, a digital signal processor (DSP), an SoC, network computers ("NetPCs"), set-top boxes, network hubs, wide area network ("WAN") switches, or any other system that may perform one or more instructions. In an embodiment, computer system 1200 may be used in devices such as graphics processing units (GPUs), network adapters, central processing units, and network devices such as switches (e.g., a high-speed direct GPU-to-GPU interconnect such as the NVIDIA GH100 NVLINK or the NVIDIA Quantum 2 64 Ports InfiniBand NDR Switch).

In at least one embodiment, computer system 1200 may include, without limitation, processor 1202 that may include, without limitation, one or more execution units 1206 that may be configured to execute a Compute Unified Device Architecture ("CUDA") (CUDA® is developed by NVIDIA Corporation of Santa Clara, CA) program. In at least one embodiment, a CUDA program is at least a portion of a software application written in a CUDA programming language. In at least one embodiment, computer system 1200 is a single processor desktop or server system. In at least one embodiment, computer system 1200 may be a multiprocessor system. In at least one embodiment, processor 1202 may include, without limitation, a CISC microprocessor, a RISC microprocessor, a VLIW microprocessor, and a processor implementing a combination of instruction sets, or any other processor device, such as a digital signal processor, for example. In at least one embodiment, processor 1202 may be coupled to a processor bus 1212 that may transmit data signals between processor 1202 and other components in computer system 1200.

In at least one embodiment, processor 1202 may include, without limitation, a Level 1 ("L1") internal cache memory ("cache") 1242. In at least one embodiment, processor 1202 may have a single internal cache or multiple levels of internal cache. In at least one embodiment, cache memory may reside external to processor 1202. In at least one embodiment, processor 1202 may also include a combination of both internal and external caches. In at least one embodiment, a register file 1204 may store different types of data in various registers including, without limitation, integer registers, floating point registers, status registers, and instruction pointer registers.

In at least one embodiment, execution unit 1206, including, without limitation, logic to perform integer and floating point operations, also resides in processor 1202. Processor 1202 may also include a microcode ("ucode") read only memory ("ROM") that stores microcode for certain macro instructions. In at least one embodiment, execution unit 1206 may include logic to handle a packed instruction set 1210. In at least one embodiment, by including packed instruction set 1210 in an instruction set of a general-purpose processor 1202, along with associated circuitry to execute instructions, operations used by many multimedia applications may be performed using packed data in a general-purpose processor 1202. In at least one embodiment, many multimedia applications may be accelerated and executed more efficiently by using full width of a processor's data bus for performing operations on packed data, which may eliminate a need to transfer smaller units of data across a processor's data bus to perform one or more operations one data element at a time.

In at least one embodiment, execution unit 1208 may also be used in microcontrollers, embedded processors, graphics devices, DSPs, and other types of logic circuits. In at least one embodiment, computer system 1200 may include, without limitation, a memory 1222. In at least one embodiment, memory 1222 may be implemented as a DRAM device, an SRAM device, flash memory device, or other memory devices. Memory 1222 may store instruction(s) 1244 and/or data 1224 represented by data signals that may be executed by processor 1202.

In at least one embodiment, a system logic chip may be coupled to a processor bus 1212 and memory 1222. In at least one embodiment, the system logic chip may include, without limitation, a memory controller hub ("MCH") 1218, and processor 1202 may communicate with MCH 1218 via processor bus 1212. In at least one embodiment, MCH 1218 may provide a high bandwidth memory path 1220 to memory 1222 for instruction and data storage and for storage of graphics commands, data, and textures. In at least one embodiment, MCH 1218 may direct data signals between processor 1202, memory 1222, and other components in computer system 1200 and may bridge data signals between processor bus 1212, memory 1222, and a system I/O 1246. In at least one embodiment, a system logic chip may provide a graphics port for coupling to a graphics controller. In at least one embodiment, MCH 1218 may be coupled to memory 1222 through high bandwidth memory path 1220, and graphics/video card 1214 may be coupled to MCH 1218 through an Accelerated Graphics Port ("AGP") interconnect 1216.

In at least one embodiment, computer system 1200 may use system I/O 1246 that is a proprietary hub interface bus to couple MCH 1218 to I/O controller hub ("ICH") 1238. In at least one embodiment, ICH 1238 may provide direct connections to some I/O devices via a local I/O bus. In at least one embodiment, a local I/O bus may include, without limitation, a high-speed I/O bus for connecting peripherals to memory 1222, a chipset, and processor 1202. Examples may include, without limitation, an audio controller 1236, a firmware hub ("flash BIOS") 1248, a wireless transceiver 1232, a data storage 1228, a legacy I/O controller 1226 containing a user input interface 1230, a keyboard interface, a serial expansion port 1234, such as a USB, and a network controller 1240. In at least one embodiment, the network controller 1240 includes the harmonic phase correction block 130 as described herein. Data storage 1228 may comprise a hard disk drive, a floppy disk drive, a CD-ROM device, a flash memory device, or other mass storage device.

In at least one embodiment, FIG. 12 illustrates a system, which includes interconnected hardware devices or "chips." In at least one embodiment, FIG. 12 may illustrate an example SoC. In at least one embodiment, devices illustrated in FIG. 12 may be interconnected with proprietary interconnects, standardized interconnects (e.g., PCIe), or some combination thereof. In at least one embodiment, one or more components of computer system 1200 are interconnected using compute express link ("CXL") interconnects.

Figure 13:
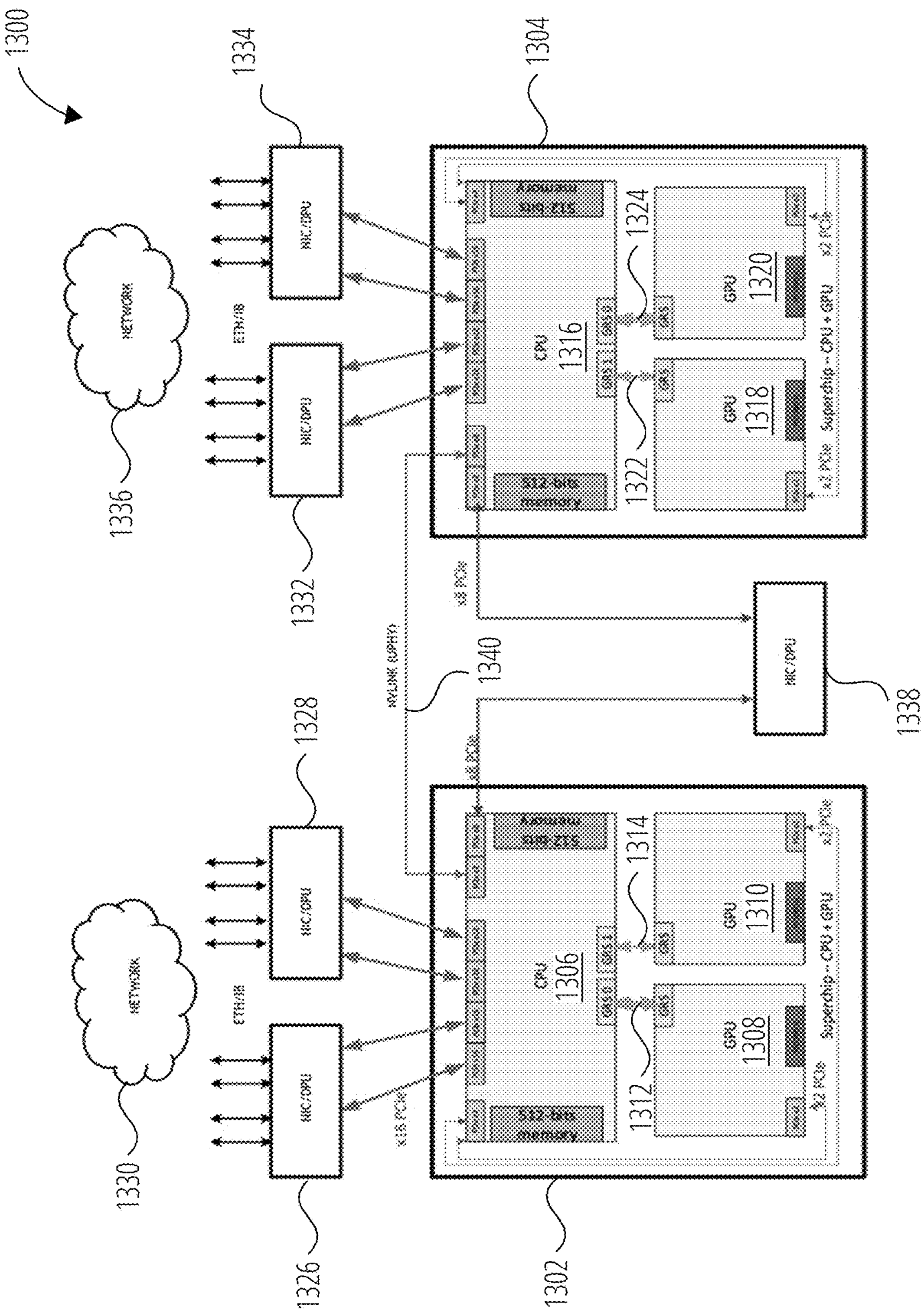
FIG. 13 is a block diagram of a computing system having two processing devices coupled to each other and multiple networks according to at least one embodiment.

FIG. 13 is a block diagram of a computing system 1300 having two processing devices coupled to each other and multiple networks according to at least one embodiment. The computing system 1300 is designed with multiple integrated circuits (referred to as processing devices), where each integrated circuit includes a CPU and two GPUs, forming a powerful and flexible architecture. These processing devices are interconnected via an NVLink (or other high-speed interconnect), enabling high-speed communication between the processing devices, and are also connected through a Network Interface Card (NIC) or Data Processing Unit (DPU) to ensure efficient data transfer across the computing system 1300. The coupling of processing devices through NVLink allows for seamless data exchange and parallel processing, enhancing overall computational performance. Additionally, these processing devices are connected to multiple networks through one or more network interface cards (NICs) or DPUs, enabling the system to handle complex, multi-network tasks with high bandwidth and low latency. This configuration makes the computing system 1300 highly suitable for demanding applications that require significant processing power, such as artificial intelligence (AI), machine learning (ML), and data-intensive computing, while ensuring robust connectivity and scalability across various networked environments. The integrated circuits of the computing system 1300 can include one or more CPUs and one or more GPUs. An example architecture of a multi-GPU architecture is illustrated in FIG. 13.

As illustrated in FIG. 13, the computing system 1300 includes a processing device 1302 with a multi-GPU architecture. In particular, the processing device 1302 includes a CPU 1306, a GPU 1308, and a GPU 1310. The CPU 1306 can be coupled to the GPU 1308 via a die-to-die (D2D) or chip-to-chip (C2C) interconnect 1312, such as a Ground-Referenced Signaling interconnect (GRS interconnect). The CPU 1306 can be coupled to the GPU 1310 via a D2D or C2C interconnect 1314. The CPU 1306 can also couple to the GPU 1308 and GPU 1310 via PCIe interconnects. The CPU 1306 can be coupled to one or more network interface cards (NICs) or data processing units (DPUs), which are coupled to one or more networks. For example, as illustrated in FIG. 13, the CPU 1306 is coupled to a first NIC/DPU 1326, which is coupled to a network 1330. The CPU 1306 is also coupled to a second NIC/DPU 1328, which is coupled to the network 1330. The NIC/DPU 1326 and NIC/DPU 1328 can be coupled to the network 1330 over Ethernet (ETH), NVLink, or InfiniBand (IB) connections.

The computing system 1300 also includes a processing device 1304 with a multi-GPU architecture. In particular, the processing device 1304 includes a CPU 1316, a GPU 1318, and a GPU 1320. The CPU 1316 can be coupled to the GPU 1318 via a D2D or C2C interconnect 1322. The CPU 1316 can be coupled to the GPU 1320 via a D2D or C2C interconnect 1324. The CPU 1316 can also couple to the GPU 1318 and GPU 1320 via PCIe interconnects. The CPU 1316 can be coupled to one or more NICs or DPUs, which are coupled to one or more networks. For example, as illustrated in FIG. 13, the CPU 1316 is coupled to a first NIC/DPU 1332, which is coupled to a network 1336. The CPU 1316 is also coupled to a second NIC/DPU 1334, which is coupled to the network 1336. The NIC/DPU 1332 and NIC/DPU 1334 can be coupled to the network 1336 over Ethernet (ETH), NVLink, or InfiniBand (IB) connections.

In at least one embodiment, the processing device 1302 and the processing device 1304 can communicate with each other via a NIC/DPU 1338, such as over PCIe interconnects. The processing device 1302 and processing device 1304 can also communicate with each other over a high-bandwidth communication interconnects 1340, such as an NVLink interconnect or other high-speed interconnects.

The computing system 1300 includes various types of interconnects. Each of the interconnects can include the harmonic phase correction block 130 described herein. The harmonic phase correction block 130 can be part of a front-end equalizer circuit of a receiver analog front-end circuit (RX AFE circuit). The RX AFE circuit can be part of Serializer/Deserializer circuit (SerDes circuit). The SerDes circuit can be a transceiver that converts parallel data to serial data and vice versa. SerDes circuits can facilitate transmission between two devices over serial streams, reducing the number of data paths, wires/traces, terminals, etc. SerDes circuits can include one or more RX AFE circuits, which are coupled between terminals and analog-to-digital converters (ADC) of the SerDes circuit. The SerDes circuit can also include other components, such as a clock and data recovery circuit, equalization blocks, symbol detectors. In at least one embodiment, the clock and data recovery circuit includes a feedback loop with a phase detector, a filter, and a controlled oscillator (CO) in a closed feedback loop. The CO can be a digitally-controlled oscillator (DCO), a voltage-controlled oscillator (VCO), or the like, as described herein. The ADC generates samples of an incoming data signal. The equalization block can determine current data based on the samples and provides an equalization output. The equalization output can be used by the phase detector to determine the phase information. The harmonic phase correction block 130 can detect and compensate for harmonic phase noise in the current data.

Figure 14:
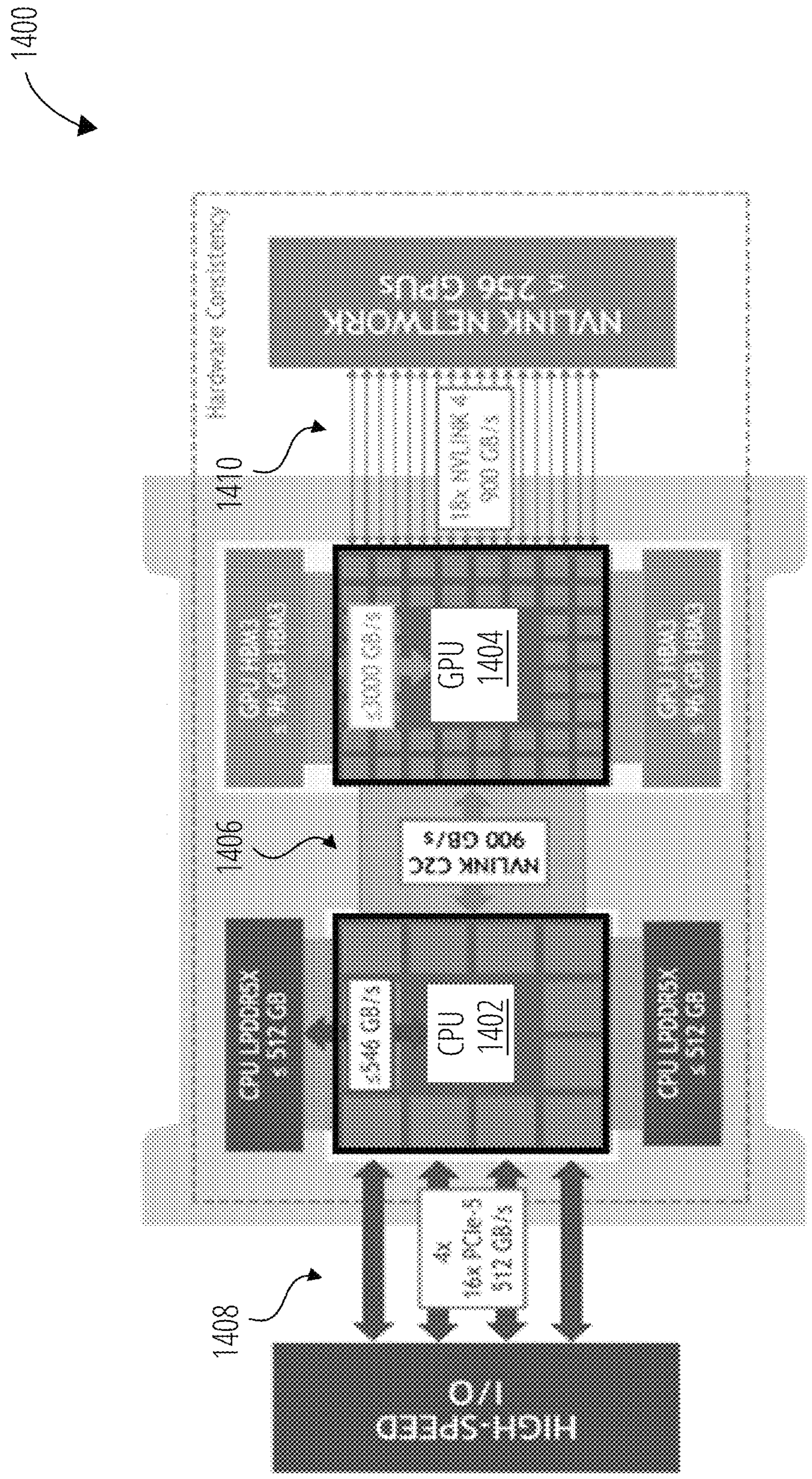
FIG. 14 is a block diagram of a computing system having a central processing unit (CPU) and a graphics processing unit (GPU) in a single integrated circuit according to at least one embodiment.

FIG. 14 is a block diagram of a computing system 1400 having a CPU 1402 and a GPU 1404 in a single integrated circuit according to at least one embodiment. The computing system 1400 can be a highly integrated design where a CPU 1402 and GPU 1404 are connected on a single integrated circuit, utilizing an NVLink C2C (Chip-to-Chip) interconnect 1406 to enable fast, low-latency communication between the two processing units. This close integration allows for efficient data transfer and parallel processing between the CPU 1402 and GPU 1404, optimizing performance for complex computational tasks. The GPU elements within the computing system 1400 can be interconnected using an NVLink network, allowing for scalability up to 256 GPU elements, creating a powerful, unified processing environment ideal for large-scale AI, ML, and high-performance computing applications. The NVLink network can be a GPU fabric of high-bandwidth communication interconnects 1410. Additionally, the computing system 1400 can be designed to interface with a high-speed I/O through PCIe interconnects 1408, ensuring rapid data transfer to and from external devices, further enhancing the system's capabilities in handling data-intensive tasks and providing robust connectivity to peripheral components. It should be noted that the C2C interconnects 1406 can be considered D2D interconnects since the CPU 1402 and the GPU 1404 are located on the same integrated circuit. The integrated circuit can include CPU memory (also referred to as main memory) and GPU memory, which are accessible by the CPU 1402 and the GPU 1404, respectively, over high-speed interconnects. The computing system 1400 can bring together performance of the GPU 1404 with the versatility of the CPU 1402. The CPU 1402 can be connected with a high-bandwidth and memory coherent C2C interconnects 1406 in a single integrated circuit. The computing system 1400 can support a link switch system.

The computing system 1400 includes various types of interconnects. Each of the interconnects can include the harmonic phase correction block 130 described herein. The harmonic phase correction block 130 can be part of a front-end equalizer circuit of a receiver analog front-end circuit (RX AFE circuit). The RX AFE circuit can be part of Serializer/Deserializer circuit (SerDes circuit). The SerDes circuit can be a transceiver that converts parallel data to serial data and vice versa. SerDes circuits can facilitate transmission between two devices over serial streams, reducing the number of data paths, wires/traces, terminals, etc. SerDes circuits can include one or more RX AFE circuits, which are coupled between terminals and analog-to-digital converters (ADC) of the SerDes circuit. The SerDes circuit can also include other components, such as a clock and data recovery circuit, equalization blocks, symbol detectors. In at least one embodiment, the clock and data recovery circuit includes a feedback loop with a phase detector, a filter, and a controlled oscillator (CO) in a closed feedback loop. The CO can be a digitally-controlled oscillator (DCO), a voltage-controlled oscillator (VCO), or the like, as described herein. The ADC generates samples of an incoming data signal. The equalization block can determine current data based on the samples and provides an equalization output. The equalization output can be used by the phase detector to determine the phase information. The harmonic phase correction block 130 can detect and compensate for harmonic phase noise in the current data.

Figure 15:
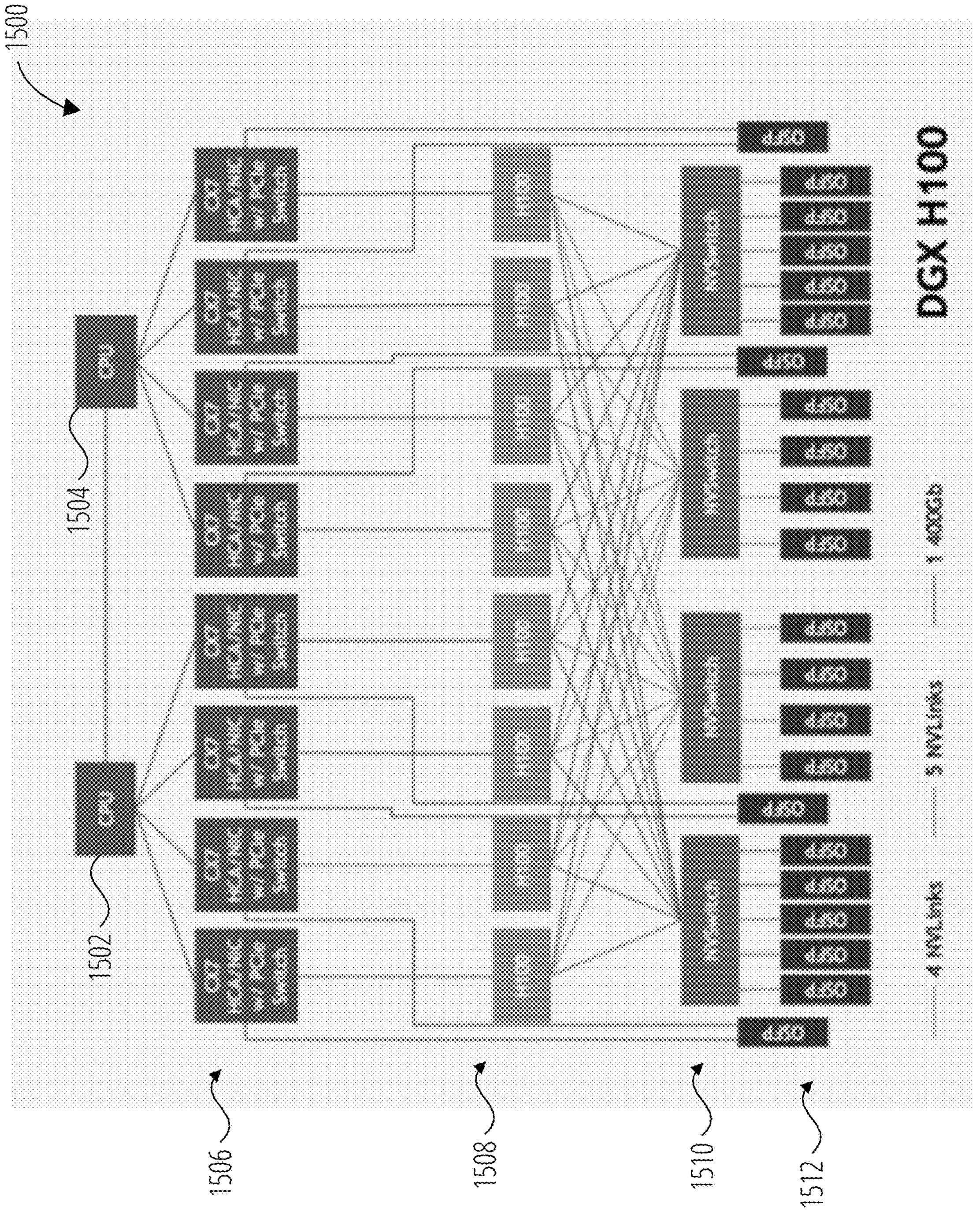
FIG. 15 is a block diagram of a computing system having tensor core graphics processing units (GPUs) according to at least one embodiment.

FIG. 15 is a block diagram of a computing system 1500 having tensor core GPUs 1508 according to at least one embodiment. The computing system 1500 can be a DGX H100 system, which is a high-performance computing platform designed to meet the demands of AI, ML, and deep learning (DL) workloads. The computing system 1500 can include multiple tensor core GPUs 1508 (e.g., NVIDIA H100 Tensor Core GPUs). The tensor core GPUs 1508 can each be one of the integrated circuits described above with respect to FIG. 14. The tensor core GPUs 1508 can be optimized for AI/ML/DL applications, offering exceptional performance for deep learning training, inference, and high-performance computing tasks. The tensor core GPUs 1508 within the computing system 1500 are interconnected using high-speed communication interfaces like NVLinks, enabling rapid data transfer between them, which is crucial for handling large-scale AI models and datasets with low latency. This computing system 1500 is designed for scalability, allowing for the integration of additional GPUs as required, making it versatile enough for research, development, and deployment in data centers for production AI workloads. Each GPU is equipped with Tensor Cores, specialized processing units that accelerate matrix operations, a fundamental component of AI and deep learning algorithms. These Tensor Cores enable the system to perform mixed-precision calculations efficiently, balancing speed and accuracy. Given the power consumption and heat generation of multiple tensor core GPUs 1508, the computing system 1500 can include advanced cooling solutions and power management features to ensure safe operation while maintaining peak performance. It is supported by a comprehensive software ecosystem, including NVIDIA's CUDA programming model, AI frameworks like TensorFlow and PyTorch, and other HPC and AI software tools, which enable developers and researchers to harness the full power of the tensor core GPUs 1508 for their specific applications. The computing system 1500 is ideally suited for large-scale AI model training, real-time inference, scientific simulations, data analytics, and other compute-intensive tasks that require massive parallel processing power.

The tensor core GPUs 1508 can be coupled to multiple CPUs, such as CPU 1502 and CPU 1504, using switches 1506 (e.g., CX7 HCA/NIC with PCIe switch). The tensor core GPUs 1508 can be coupled to each other via switches 1510 (e.g., NVSwitches). The switches 1506 and switches 1510 can be coupled to high-speed transceiver modules 1512. The high-speed transceiver modules 1512 can be Octal Small Form-factor Pluggable (OSFP) modules. OSFP modules refer to high-speed transceiver modules designed for rapid data communication, particularly in environments requiring significant bandwidth, such as data centers and high-performance computing systems. These modules support extremely high data rates, typically up to 400 Gbps per module, with future capabilities extending to 800 Gbps or more. OSFP modules interface with the system via the PCIe interface, enabling fast and efficient data transfer between the integrated CPU-GPU components and external networks or other connected systems. Their hot-pluggable nature allows for easy insertion or removal without the need to power down the system, offering flexibility and ease of maintenance, which is crucial in critical-uptime environments. Additionally, OSFP modules are designed for high density, maximizing the number of high-speed connections within limited space, such as in densely packed server racks. By adhering to the latest networking standards, OSFP modules ensure the computing system 1500 remains capable of meeting increasing data demands and can be upgraded to support future advancements in network speeds, thus contributing to the system's overall performance and scalability.

In at least one embodiment, the computing system 1500 can be considered a data-network configuration with full-bandwidth intra-server NVLinks. In this example, all eight tensor core GPUs 1508 can simultaneously saturate eighteen NVLinks to other GPUs within the server. The bandwidth is limited by over-subscription from multiple other GPUs. In another embodiments, data-network configuration can be a half-bandwidth intra-server NVLinks. In this example, all eight tensor core GPUs 1508 can half-subscribe eighteen NVLinks to GPUs in other servers. Four tensor core GPUs 1508 can saturate eighteen NVLinks to GPUs in other servers. This is equivalent of full-bandwidth on AllReduce with Scalable Hierarchical Aggregation and Reduction Protocol (SHARP). The reduction in all-2-all (All2All) bandwidth is a balance with server complexity and costs. In at least one embodiment, all eight tensor core GPUs 1508 can independently transfer data, using Remote Direct Memory Access (RDMA) protocol, over its own dedicated switch (e.g., 400 Gb/s HCA/NIC) in a multi-rail InfiniBand/Ethernet configuration. In this example, 800 GBps of aggregate full-duplex to non-NVLink network devices.

The computing system 1500 includes various types of interconnects. Each of the interconnects can include the harmonic phase correction block 130 described herein. The harmonic phase correction block 130 can be part of a front-end equalizer circuit of a receiver analog front-end circuit (RX AFE circuit). The RX AFE circuit can be part of Serializer/Deserializer circuit (SerDes circuit). The SerDes circuit can be a transceiver that converts parallel data to serial data and vice versa. SerDes circuits can facilitate transmission between two devices over serial streams, reducing the number of data paths, wires/traces, terminals, etc. SerDes circuits can include one or more RX AFE circuits, which are coupled between terminals and analog-to-digital converters (ADC) of the SerDes circuit. The SerDes circuit can also include other components, such as a clock and data recovery circuit, equalization blocks, symbol detectors. In at least one embodiment, the clock and data recovery circuit includes a feedback loop with a phase detector, a filter, and a controlled oscillator (CO) in a closed feedback loop. The CO can be a digitally-controlled oscillator (DCO), a voltage-controlled oscillator (VCO), or the like, as described herein. The ADC generates samples of an incoming data signal. The equalization block can determine current data based on the samples and provides an equalization output. The equalization output can be used by the phase detector to determine the phase information. The harmonic phase correction block 130 can detect and compensate for harmonic phase noise in the current data.

Other variations are within spirit of present disclosure. Thus, while disclosed techniques are susceptible to various modifications and alternative constructions, certain illustrated embodiments thereof are shown in drawings and have been described above in detail. It should be understood, however, that there is no intention to limit the disclosure to a specific form or forms disclosed, but on the contrary, the intention is to cover all modifications, alternative constructions, and equivalents falling within the spirit and scope of the disclosure, as defined in appended claims.

Use of terms "a" and "an" and "the" and similar referents in the context of describing disclosed embodiments (especially in the context of following claims) are to be construed to cover both singular and plural, unless otherwise indicated herein or clearly contradicted by context, and not as a definition of a term. Terms "comprising," "having," "including," and "containing" are to be construed as open-ended terms (meaning "including, but not limited to,") unless otherwise noted. "Connected," when unmodified and referring to physical connections, is to be construed as partly or wholly contained within, attached to, or joined together, even if there is something intervening. Recitations of ranges of values herein are merely intended to serve as a shorthand method of referring individually to each separate value falling within the range, unless otherwise indicated herein, and each separate value is incorporated into the specification as if it were individually recited herein. In at least one embodiment, the use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but subset and corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in an illustrative example of a set having three members, conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, the term "plurality" indicates a state of being plural (e.g., "a plurality of items" indicates multiple items). In at least one embodiment, the number of items in a plurality is at least two, but can be more when so indicated either explicitly or by context. Further, unless stated otherwise or otherwise clear from context, the phrase "based on" means "based at least in part on" and not "based solely on."

Operations of processes described herein can be performed in any suitable order unless otherwise indicated herein or otherwise clearly contradicted by context. In at least one embodiment, a process such as those processes described herein (or variations and/or combinations thereof) is performed under the control of one or more computer systems configured with executable instructions and is implemented as code (e.g., executable instructions, one or more computer programs or one or more applications) executing collectively on one or more processors, by hardware or combinations thereof. In at least one embodiment, code is stored on a computer-readable storage medium, for example, in the form of a computer program comprising a plurality of instructions executable by one or more processors. In at least one embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In at least one embodiment, code (e.g., executable code or source code) is stored on a set of one or more non-transitory computer-readable storage media having stored thereon executable instructions (or other memory to store executable instructions) that, when executed (i.e., as a result of being executed) by one or more processors of a computer system, cause a computer system to perform operations described herein. In at least one embodiment, a set of non-transitory computer-readable storage media comprises multiple non-transitory computer-readable storage media and one or more individual non-transitory storage media of multiple non-transitory computer-readable storage media lack all of the code while multiple non-transitory computer-readable storage media collectively store all of the code. In at least one embodiment, executable instructions are executed such that different instructions are executed by different processors.

Accordingly, in at least one embodiment, computer systems are configured to implement one or more services that singly or collectively perform operations of processes described herein and such computer systems are configured with applicable hardware and/or software that enable the performance of operations. Further, a computer system that implements at least one embodiment of present disclosure is a single device and, in another embodiment, is a distributed computer system comprising multiple devices that operate differently such that distributed computer system performs operations described herein and such that a single device does not perform all operations.

Use of any and all examples, or exemplary language (e.g., "such as") provided herein, is intended merely to better illuminate embodiments of the disclosure, and does not pose a limitation on the scope of the disclosure unless otherwise claimed. No language in the specification should be construed as indicating any non-claimed element as essential to the practice of the disclosure.

All references, including publications, patent applications, and patents, cited herein are hereby incorporated by reference to the same extent as if each reference were individually and specifically indicated to be incorporated by reference and were set forth in its entirety herein.

In description and claims, the terms "coupled" and "connected," along with their derivatives, may be used. It should be understood that these terms may not be intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still co-operate or interact with each other.

Unless specifically stated otherwise, it may be appreciated that throughout specification terms such as "processing," "computing," "calculating," "determining," or like, refer to action and/or processes of a computer or computing system, or similar electronic computing device, that manipulate and/or transform data represented as physical, such as electronic, quantities within computing system's registers and/or memories into other data similarly represented as physical quantities within computing system's memories, registers or other such information storage, transmission or display devices.

In a similar manner, the term "processor" may refer to any device or portion of a device that processes electronic data from registers and/or memory and transform that electronic data into other electronic data that may be stored in registers and/or memory. As a non-limiting example, a "processor" may be a network device. A "computing platform" may comprise one or more processors. As used herein, "software" processes may include, for example, software and/or hardware entities that perform work over time, such as tasks, threads, and intelligent agents. Also, each process may refer to multiple processes for continuously or intermittently carrying out instructions in sequence or in parallel. In at least one embodiment, the terms "system" and "method" are used herein interchangeably as far as the system may embody one or more methods and methods may be considered a system.

In the present document, references may be made to obtaining, acquiring, receiving, or inputting analog or digital data into a subsystem, computer system, or computer-implemented machine. In at least one embodiment, the process of obtaining, acquiring, receiving, or inputting analog and digital data can be accomplished in a variety of ways such as by receiving data as a parameter of a function call or a call to an application programming interface. In at least one embodiment, processes of obtaining, acquiring, receiving, or inputting analog or digital data can be accomplished by transferring data via a serial or parallel interface. In at least one embodiment, processes of obtaining, acquiring, receiving, or inputting analog or digital data can be accomplished by transferring data via a computer network from providing entity to acquiring entity. In at least one embodiment, references may also be made to providing, outputting, transmitting, sending, or presenting analog or digital data. In various examples, processes of providing, outputting, transmitting, sending, or presenting analog or digital data can be accomplished by transferring data as an input or output parameter of a function call, a parameter of an application programming interface or an inter-process communication mechanism.

Although descriptions herein set forth example embodiments of described techniques, other architectures may be used to implement described functionality, and are intended to be within the scope of this disclosure. Furthermore, although specific distributions of responsibilities may be defined above for purposes of description, various functions and responsibilities might be distributed and divided in different ways, depending on circumstances.

Furthermore, although the subject matter has been described in language specific to structural features and/or methodological acts, it is to be understood that subject matter claimed in appended claims is not necessarily limited to specific features or acts described. Rather, specific features and acts are disclosed as exemplary forms of implementing the claims.

What is claimed is:

1. An integrated circuit comprising:

a clock source to generate a clock signal having a first frequency;

an analog-to-digital converter (ADC) to sample an incoming signal to obtain data samples using a sampling clock, wherein the data samples comprise a periodic and synchronous phase error caused by the clock signal, wherein the periodic and synchronous phase error has a harmonic of the first frequency; and a signal processing circuit coupled to the ADC and the clock source, wherein the signal processing circuit comprises a harmonic phase correction block to detect and compensate for the periodic and synchronous phase error in the data samples to obtain corrected data samples.

2. The integrated circuit of claim 1, further comprising a power supply grid, wherein the incoming signal is received over a signal connection coupled to the integrated circuit, wherein the periodic and synchronous phase error originates from an undesired coupling from the clock signal into the power supply grid of the integrated circuit or from the clock signal into the incoming signal itself.

3. The integrated circuit of claim 1, wherein the harmonic is at least one of a first harmonic, a sub-harmonic, or a super-harmonic of the first frequency.

4. The integrated circuit of claim 1, wherein the harmonic phase correction block comprises:

a state machine to output a control signal at each of n number of subsegments of a clock cycle of the clock signal;

an interpolator block to receive N number of data samples from the ADC and interpolate the corrected data samples using a number of tap coefficients;

a phase detector block coupled to an input or an output of an interpolator block, the phase detector block to determine a phase error;

a filter coupled between the phase detector block and the interpolator block in a negative feedback loop, the filter to receive the phase error from the phase detector block and accumulate the phase error to obtain an output offset value for each of the n number of subsegments; and a register to store the output offset values output by the filter after each of the n number of subsegments, wherein the interpolator block is to receive the output offset values from the register, wherein the values of the tap coefficients are derived from the output offset values, wherein n and N are non-zero positive integer values.

5. The integrated circuit of claim 4, wherein N is equal to 128 and n is equal to 8.

6. The integrated circuit of claim 4, wherein:

the ADC is a sub-sampled ADC;

the interpolator block comprises a three-tap feedforward equalizer (FFE);

the phase detector block comprises a transition-based phase detector covering one subsegment of the n number of subsegments;

the state machine is to step through the n number of subsegments and update the register one at a time; and the filter is to accumulate the phase error of one subsegment of the n number of subsegments to obtain the output offset value and update the output offset value after storing the output offset value in the register.

7. The integrated circuit of claim 4, wherein the interpolator block comprises a three-tap finite impulse response (FIR) filter comprising a main tap coefficient, a second tap coefficient equal to a negative version of the output offset value, and a third tap coefficient equal to a positive version of the output offset value.

8. The integrated circuit of claim 1, wherein the clock source comprises a digitally controlled oscillator (DCO) to generate a DCO signal having a third frequency higher than the first frequency, wherein the periodic and synchronous phase error has the third frequency, wherein the third frequency is at least one of a first harmonic, a sub-harmonic, or a super-harmonic of the first frequency.

9. The integrated circuit of claim 1, further comprising a clock and data recovery circuit (CDR circuit) coupled to the ADC.

10. The integrated circuit of claim 9, wherein the signal processing circuit further comprises a jitter correction block coupled between the ADC and the harmonic phase correction block, wherein the jitter correction block is to re-sample the data samples to obtain re-sampled data samples based on a sampling offset to remove jitter from the data samples.

11. A method comprising:

generating a clock signal for a signal processing circuit, the clock signal having a first frequency;

sampling an incoming signal to obtain data samples using a sampling clock, wherein the data samples comprise a periodic and synchronous phase error caused by the clock signal, wherein the periodic and synchronous phase error has a harmonic of the first frequency; and detecting and compensating for the periodic and synchronous phase error in the data samples to obtain corrected data samples using a harmonic phase correction block of the signal processing circuit.

12. The method of claim 11, further comprising:

receiving the incoming signal over a signal connection, wherein the periodic and synchronous phase error originates from an undesired coupling from the clock signal into a power supply grid or from the clock signal into the incoming signal itself.

13. The method of claim 11, wherein detecting and compensating for the periodic and synchronous phase error comprises:

generating a control signal, using a state machine of the harmonic phase correction block, at each of n number of subsegments of a clock cycle of the clock signal;

receiving N number of the data samples and interpolating the corrected data samples using a number of tap coefficients of an interpolator block of the harmonic phase correction block;

determining a phase offset of an output of the interpolator block;

accumulating the phase offset to obtain an output offset value for each of the n number of subsegments; and storing the output offset value in a register after each of the n number of subsegments, wherein the values of the tap coefficients are derived from the output offset values, wherein n and N are non-zero positive integer values.

14. The method of claim 13, wherein N is equal to 128 and n is equal to 8.

15. The method of claim 11, further comprising, before detecting and compensating for the periodic and synchronous phase error, re-sampling the data samples to obtain re-sampled data samples based on a sampling offset to remove jitter from the data samples.

16. A receiver device comprising:

an analog-to-digital converter (ADC) to sample an incoming signal to obtain data samples; and a signal processing circuit coupled to the ADC, wherein the signal processing circuit comprises:

a clock recovery (CR) block comprising a timing error detector (TED) to measure a sampling offset of the data samples to control sampling of subsequent data by the ADC; and a harmonic phase correction block coupled to the ADC, wherein the harmonic phase correction block is to:

receive the data samples, the data samples comprising a periodic and synchronous phase error caused by a clock signal of the signal processing circuit, the clock signal having a first frequency, wherein the periodic and synchronous phase error has a harmonic of the first frequency;

detect the periodic and synchronous phase error; and compensate for the periodic and synchronous phase error in the data samples to obtain corrected data samples.

17. The receiver device of claim 16, further comprising a power supply grid, wherein the incoming signal is received over a signal connection, wherein the periodic and synchronous phase error originates from an undesired coupling from the clock signal into the power supply grid or from the clock signal into the incoming signal itself.

18. The receiver device of claim 16, wherein the harmonic phase correction block comprises:

a state machine to output a control signal at each of n number of subsegments of a clock cycle of the clock signal;

an interpolator block to receive N number of data samples from the ADC and interpolate the corrected data samples using a number of tap coefficients;

a phase detector block coupled to the output of the interpolator block, the phase detector block to determine a phase error;

a filter coupled between the phase detector block and the interpolator block in a negative feedback loop, the filter to receive the phase error from the phase detector block and accumulate the phase error to obtain an output offset value for each of the n number of subsegments; and a register to store the output offset value output by the filter after each of the n number of subsegments, wherein the interpolator block is to receive the output offset value from the register, wherein the values of the tap coefficients are derived from the output offset values, wherein n and N are non-zero positive integer values.

19. The receiver device of claim 18, wherein N is equal to 128 and n is equal to 8.

20. The receiver device of claim 18, wherein:

the ADC is a sub-sampled ADC;

the interpolator block comprises a three-tap feedforward equalizer (FFE);

the phase detector block comprises a transition-based phase detector covering one subsegment of the n number of subsegments;

the state machine is to step through the n number of subsegments and update the register one at a time; and the filter is to accumulate the phase error of one subsegment of the n number of subsegments to obtain the output offset value and update the output offset value after storing the output offset value in the register.

21. A Serializer/Deserializer (SerDes) integrated circuit (IC) comprising:

a signal processing circuit comprising a clock signal having a first frequency;

a clock and data recovery circuit comprising a phase detector to determine phase information about a transmit clock used to transmit a signal to the SerDes IC;

an analog-to-digital converter (ADC) to sample an incoming signal using a sampling clock to obtain data samples, wherein the clock and data recovery circuit is to control the sampling clock in a closed-loop fashion using the phase information;

a feedforward jitter correction circuit coupled to the clock and data recovery circuit, wherein the feedforward jitter correction circuit is to control, using the phase information, a re-sampling clock in an open-loop fashion to compensate for sampling jitter above a loop bandwidth of the clock and data recovery circuit; and a harmonic phase correction block coupled to the feed-forward jitter correction circuit, the harmonic phase correction block to detect and compensate for a periodic and synchronous phase error in the data samples to obtain corrected data samples, wherein the periodic and synchronous phase error is caused by the clock signal, wherein the periodic and synchronous phase error has a harmonic of the first frequency.

22. The SerDes IC of claim 21, wherein the harmonic phase correction block comprises:

a state machine to output a control signal at each of n number of subsegments of a clock cycle of the clock signal;

an interpolator block to receive N number of data samples and interpolate the corrected data samples using a number of tap coefficients;

a phase detector block coupled to the output of the interpolator block, the phase detector block to determine a phase error;

a filter coupled between the phase detector block and the interpolator block in a negative feedback loop, the filter to receive the phase error from the phase detector block and accumulate the phase error to obtain an output offset value for each of the n number of subsegments; and a register to store the output offset value output by the filter after each of the n number of subsegments, wherein the interpolator block is to receive the output offset value from the register, wherein the values of the tap coefficients are derived from the output offset values, wherein n and N are non-zero positive integer values.

23. The SerDes IC of claim 22, wherein:

the ADC is a sub-sampled ADC;

the interpolator block comprises a three-tap feedforward equalizer (FFE);

the phase detector block comprises a transition-based phase detector covering one subsegment of the n number of subsegments;

the state machine is to step through the n number of subsegments and update the register one at a time; and the filter is to accumulate the phase error of one subsegment of the n number of subsegments to obtain the output offset value and update the output offset value after storing the output offset value in the register.

* * * * *